United States Patent
Raghavan et al.

(10) Patent No.: US 11,206,075 B2
(45) Date of Patent: Dec. 21, 2021

(54) BEAM REFINEMENT IN A MILLIMETER WAVE CHANNEL

(71) Applicant: QUALCOMM Incorporated, San Diego, CA (US)

(72) Inventors: Vasanthan Raghavan, West Windsor Township, NJ (US); Juergen Cezanne, Ocean Township, NJ (US); Kobi Ravid, Closter, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 16/680,338

(22) Filed: Nov. 11, 2019

(65) Prior Publication Data

US 2020/0186229 A1    Jun. 11, 2020

Related U.S. Application Data

(60) Provisional application No. 62/776,264, filed on Dec. 6, 2018.

(51) Int. Cl.
*H04B 7/06*    (2006.01)
*H04W 16/28*   (2009.01)
(Continued)

(52) U.S. Cl.
CPC .......... *H04B 7/0695* (2013.01); *H04W 16/28* (2013.01); *H04W 24/10* (2013.01); *H04W 72/046* (2013.01)

(58) Field of Classification Search
CPC .... H04B 7/0695; H04W 16/28; H04W 24/10; H04W 72/046
See application file for complete search history.

(56) References Cited

U.S. PATENT DOCUMENTS

2019/0052331 A1*   2/2019   Chang ................. H04B 7/0626
2019/0349063 A1*  11/2019   Takano ................ H04W 24/10

FOREIGN PATENT DOCUMENTS

WO    WO-2017194643 A1    11/2017
WO    WO-2018123326 A1    7/2018

OTHER PUBLICATIONS

3GPP; 3GPP TSG RAN1 86b R1-1610145; 2016 (Year: 2016).*

(Continued)

*Primary Examiner* — Ricky Q Ngo
*Assistant Examiner* — Stephen N Steiner
(74) *Attorney, Agent, or Firm* — Holland & Hart LLP

(57) ABSTRACT

Methods, systems, and devices for wireless communications are described. A communication device may perform a first set of beam measurements for a first plurality of beams over a wireless channel, each beam in the first plurality of beams having a first beam-width. The communication device may transmit a first beam measurement report for the first plurality of beams, the first beam measurement report indicating a beam sweep order for a second set of beam measurements for a second plurality of beams. The communication device may perform the second set of beam measurements for the second plurality of beams over the wireless channel according to the indicated beam sweep order, each beam in the second plurality of beams having a second beam-width that is narrower than the first beam-width.

23 Claims, 15 Drawing Sheets

(51) Int. Cl.
H04W 72/04 (2009.01)
H04W 24/10 (2009.01)

(56) References Cited

OTHER PUBLICATIONS

International Search Report and Written Opinion—PCT/US2019/061000—ISA/EPO—Mar. 13, 2020.
QUALCOMM: "Beam Management for NR", 3GPP Draft, 3GPP TSG RAN1 86b, R1-1610145_Beam_Management_NR, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 9, 2016 (Oct. 9, 2016), XP051150168, 5 Pages, Retrieved from the Internet: URL: http://www.3gpp.org/ftp/Meetings_3GPP_SYNC/RAN1/Docs/, [retrieved on Oct. 9, 2016], Section 2.2, p. 3.

* cited by examiner

| Step 405: | Step 410: | Step 415: | Step 420: |
|---|---|---|---|
| P-2 on $BP_1 \rightarrow BP_{1'}$ | P-2 on $BP_2 \rightarrow BP_{2'}$ | P-3 on $BP_{1'} \rightarrow BP_{1''}$ | P-3 on $BP_{2'} \rightarrow BP_{2''}$ |

| Step 425: | Step 430: | Step 435: | Step 440: |
|---|---|---|---|
| P-2 on $BP_1 \rightarrow BP_{1'}$ | P-3 on $BP_{1'} \rightarrow BP_{1''}$ | P-2 on $BP_2 \rightarrow BP_{2'}$ | P-3 on $BP_{2'} \rightarrow BP_{2''}$ |

BEAM REFINEMENT IN A MILLIMETER WAVE CHANNEL

CROSS REFERENCE

The present Application for Patent claims the benefit of U.S. Provisional Patent Application No. 62/776,264 by RAGHAVAN et al., entitled "BEAM REFINEMENT IN A MILLIMETER WAVE CHANNEL," filed Dec. 6, 2018, assigned to the assignee hereof, and expressly incorporated herein.

BACKGROUND

The following relates generally to wireless communications, and more specifically to methods for beam refinement in a millimeter wave (mmW) channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may operate in mmW frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed. Moreover, a receiving device may use beamforming techniques to configure antenna(s) and/or antenna array(s) such that transmissions are received in a directional manner.

mmW networks may perform a variety of beam management/beam refinement procedures in order to monitor beam performance and identify potential candidate beams available for use if the current active beam suddenly becomes unavailable and/or deteriorates below an acceptable threshold level. In some aspects, such beam management techniques may include a transmitting device transmitting multiple beamformed signals in a sectoral or sweeping manner around its coverage area. The receiving device may monitor for the beamformed signals and measure signal strengths using one or more receive beams. Conventionally, the transmitting device (e.g., a base station) may configure the receiving device to return channel measurements for a particular number of its beamformed signals. The receiving device identifies the particular number of transmit beams and corresponding receive beams having the strongest signal level and returns those to the transmitting device in a beam measurement report. Conventional techniques, however, follow a fixed approach for beam management, which consumes excessive time/resources and, more particularly, do not provide a mechanism to deviate from the conventional lock-step approach.

Another function that may be performed in a mmW network may include cluster identification. Broadly, a cluster may refer to a property of a wireless channel between the transmitting device and the receiving device. For example, the cluster within the wireless channel may impact the propagation path/characteristics of the beamformed signal in some manner, at least to some degree. For example, glass windows or other flat, reflective surfaces may reflect a beamformed transmission in the direction of the receiving device, which may create a cluster for the wireless channel. Cluster identification is an important function in determining the channel propagation characteristics in a mmW network. However, conventional techniques do not provide a mechanism that leads to adequate identification of all clusters within the mmW channel. For example, conventional beamforming techniques typically do not provide a mechanism for distinguishing sub-dominant clusters from dominant clusters, either based on the corresponding received signal strength for each cluster and/or based on the spatial separation between the reported beams associated with each cluster. Moreover, conventional approaches do not provide a mechanism to vary from the lock-step beam refinement procedure to improve cluster identification/delineation.

SUMMARY

The described techniques relate to improved methods, systems, devices, and apparatuses that support methods for beam refinement in a millimeter wave (mmW) channel. Generally, the described techniques on better beam refinement opportunities provide various mechanisms that improve identification of sub-dominant clusters within a mmW network. Aspects of the described techniques may be implemented by the transmitting device (e.g., base station) and/or by the receiving device (e.g., a UE and/or another base station). Broadly, aspects of the described techniques provide for the receiving device to assist the transmitting device with beam refinement ordering. For example, the receiving device (e.g., a first wireless device in this context) may provide additional feedback information to assist the transmitting device (e.g., a second wireless device in this context) in deciding the precise ordering for further beam refinement. Broadly, this may include the receiving device performing beam measurements for a first plurality of beams (e.g., P1 beams) over a wireless channel between the receiving device and the transmitting device. The transmitting device may configure the receiving device to provide beam measurements for a certain number of the first plurality of beams. Accordingly, the receiving device may transmit or otherwise provide an indication of a first beam measurement report to the transmitting device that includes a reference signal received power (RSRP) value and the beam index for each reported beam.

The receiving device may also configure the first beam measurement report to carry or convey an indication of a beam sweep order for use during subsequent beam measurement procedures. For example, the receiving device may utilize aspects of the described techniques to identify one or more distinct clusters in the wireless channel between the receiving device and the transmitting device and determine the beam sweep order based on the identified clusters. The transmitting device may receive the first beam measurement report and use the indicated beam sweep order when selecting transmit beams (e.g., a second plurality of transmit beams) for further beam refinement. Accordingly, the receiving device may perform beam measurements for the second plurality of transmit beams and transmit or otherwise provide a second beam measurement report to the transmitting device. The transmitting device may use the first and/or second beam measurement reports when selecting a beam for communications with the receiving device. Accordingly, aspects of the described techniques provide a mechanism whereby the UE (e.g., the receiving device) is able to instruct the base station (e.g., the transmitting device) as to which beams are utilized during the beam refinement procedure, thus conserving resources, reducing beam refinement time, and improving cluster identification/delineation.

A method of wireless communication by a first wireless device is described. The method may include performing a first set of beam measurements for a first set of beams over a wireless channel between the first wireless device and a second wireless device, each beam in the first set of beams having a first beam-width, transmitting to the second wireless device a first beam measurement report for the first set of beams, the first beam measurement report indicating a beam sweep order for a second set of beam measurements for a second set of beams, performing the second set of beam measurements for the second set of beams over the wireless channel according to the indicated beam sweep order, each beam in the second set of beams having a second beam-width that is narrower than the first beam-width, transmitting to the second wireless device a second beam measurement report based on the second set of beam measurements, and receiving from the second wireless device an indication of a beam selection for transmissions from the second wireless device based on the first and second set of beam measurements.

A first wireless apparatus for wireless communication is described. The apparatus may include a processor, memory in electronic communication with the processor, and instructions stored in the memory. The instructions may be executable by the processor to cause the apparatus to perform a first set of beam measurements for a first set of beams over a wireless channel between the first wireless apparatus and a second wireless apparatus, each beam in the first set of beams having a first beam-width, transmit to the second wireless apparatus a first beam measurement report for the first set of beams, the first beam measurement report indicating a beam sweep order for a second set of beam measurements for a second set of beams, perform the second set of beam measurements for the second set of beams over the wireless channel according to the indicated beam sweep order, each beam in the second set of beams having a second beam-width that is narrower than the first beam-width, transmit to the second wireless apparatus a second beam measurement report based on the second set of beam measurements, and receive from the second wireless apparatus an indication of a beam selection for transmissions from the second wireless apparatus based on the first and second set of beam measurements.

Another first wireless apparatus for wireless communication is described. The apparatus may include means for performing a first set of beam measurements for a first set of beams over a wireless channel between the first wireless apparatus and a second wireless apparatus, each beam in the first set of beams having a first beam-width, transmitting to the second wireless apparatus a first beam measurement report for the first set of beams, the first beam measurement report indicating a beam sweep order for a second set of beam measurements for a second set of beams, performing the second set of beam measurements for the second set of beams over the wireless channel according to the indicated beam sweep order, each beam in the second set of beams having a second beam-width that is narrower than the first beam-width, transmitting to the second wireless apparatus a second beam measurement report based on the second set of beam measurements, and receiving from the second wireless apparatus an indication of a beam selection for transmissions from the second wireless apparatus based on the first and second set of beam measurements.

A non-transitory computer-readable medium storing code for wireless communication by a first wireless device is described. The code may include instructions executable by a processor to perform a first set of beam measurements for a first set of beams over a wireless channel between the first wireless device and a second wireless device, each beam in the first set of beams having a first beam-width, transmit to the second wireless device a first beam measurement report for the first set of beams, the first beam measurement report indicating a beam sweep order for a second set of beam measurements for a second set of beams, perform the second set of beam measurements for the second set of beams over the wireless channel according to the indicated beam sweep order, each beam in the second set of beams having a second beam-width that is narrower than the first beam-width, transmit to the second wireless device a second beam measurement report based on the second set of beam measurements, and receive from the second wireless device an indication of a beam selection for transmissions from the second wireless device based on the first and second set of beam measurements.

Some examples of the method, apparatuses, and non-transitory computer-readable medium described herein may further include operations, features, means, or instructions for identifying, based on the first set beam measurements, one or more clusters associated with one or more of the beams of the first set of beams.

Some examples of the method, apparatuses, and non-transitory computer-readable medium described herein may further include operations, features, means, or instructions for transmitting an indication of the identified one or more clusters associated with the one or more of the beams from the first set of beams to the second wireless device.

In some examples of the method, apparatuses, and non-transitory computer-readable medium described herein, identifying the one or more clusters may include operations, features, means, or instructions for performing a time domain correlation of a delay spread for each beam from the first set of beams.

In some examples of the method, apparatuses, and non-transitory computer-readable medium described herein, identifying the one or more clusters may include operations, features, means, or instructions for assigning a unique receive beam weighting factor to each of two or more receive radio frequency chains of the first wireless device, and identifying, based on reception with the unique receive beam weighting factor, a received signal strength for each receive radio frequency chain of the two or more receive radio frequency chains.

Some examples of the method, apparatuses, and non-transitory computer-readable medium described herein may further include operations, features, means, or instructions for selecting the beam sweep order based on the one or more clusters associated with the wireless channel.

Some examples of the method, apparatuses, and non-transitory computer-readable medium described herein may further include operations, features, means, or instructions for identifying multiple clusters associated with a first P1 beam pair of the first set of beams and a second P1 beam pair of the first set of beams, where the beam sweep order for the second set of beam measurements includes a first P2 beam sweep of the first P1 beam pair to obtain a first P2 beam pair, followed by a first P3 beam sweep of the first P2 beam pair to obtain a first P3 beam pair, followed by a second P2 beam sweep of the second P1 beam pair to obtain a second P2 beam pair, followed by a second P3 beam sweep of the second P2 beam pair to obtain a second P3 beam pair.

Some examples of the method, apparatuses, and non-transitory computer-readable medium described herein may further include operations, features, means, or instructions for identifying a single cluster associated with a first P1 beam pair of the first set of beams and a second P1 beam pair of the first set of beams, where the beam sweep order for the second set of beam measurements includes a first P2 beam sweep of the first P1 beam pair to obtain a first P2 beam pair, followed by a second P2 beam sweep of the second P1 beam pair to obtain a second P2 beam pair, followed by a first P3 beam sweep of the first P2 beam pair to obtain a first P3 beam pair, followed by a second P3 beam sweep of the second P2 beam pair to obtain a second P3 beam pair.

In some examples of the method, apparatuses, and non-transitory computer-readable medium described herein, the beam sweep order may include operations, features, means, or instructions for a sequential beam sweep order or a non-sequential beam sweep order for the second set of beams.

A method of wireless communication by a second wireless device is described. The method may include transmitting a first set of beams over a wireless channel between the second wireless device and a first wireless device, each beam in the first set of beams having a first beam-width, receiving, from the first wireless device, a first beam measurement report for a first set of beams, the first beam measurement report indicating a beam sweep order for a second set of beam measurements for a second set of beams, transmitting the second set of beams according to the indicated beam sweep order, each beam in the second set of beams having a second beam-width that is narrower than the first beam-width, receiving a second beam measurement report from the first wireless device based on the second set of beams, and transmitting to the first wireless device an indication of a beam selected for transmissions from the second wireless device based on the first and second beam measurement reports.

A second wireless apparatus for wireless communication is described. The apparatus may include a processor, memory in electronic communication with the processor, and instructions stored in the memory. The instructions may be executable by the processor to cause the apparatus to transmit a first set of beams over a wireless channel between the second wireless apparatus and a first wireless apparatus, each beam in the first set of beams having a first beam-width, receive, from the first wireless apparatus, a first beam measurement report for a first set of beams, the first beam measurement report indicating a beam sweep order for a second set of beam measurements for a second set of beams, transmit the second set of beams according to the indicated beam sweep order, each beam in the second set of beams having a second beam-width that is narrower than the first beam-width, receive a second beam measurement report from the first wireless apparatus based on the second set of beams, and transmit to the first wireless apparatus an indication of a beam selected for transmissions from the second wireless apparatus based on the first and second beam measurement reports.

Another second wireless apparatus for wireless communication is described. The apparatus may include means for transmitting a first set of beams over a wireless channel between the second wireless apparatus and a first wireless apparatus, each beam in the first set of beams having a first beam-width, receiving, from the first wireless apparatus, a first beam measurement report for a first set of beams, the first beam measurement report indicating a beam sweep order for a second set of beam measurements for a second set of beams, transmitting the second set of beams according to the indicated beam sweep order, each beam in the second set of beams having a second beam-width that is narrower than the first beam-width, receiving a second beam measurement report from the first wireless apparatus based on the second set of beams, and transmitting to the first wireless apparatus an indication of a beam selected for transmissions from the second wireless apparatus based on the first and second beam measurement reports.

A non-transitory computer-readable medium storing code for wireless communication by a second wireless device is described. The code may include instructions executable by a processor to transmit a first set of beams over a wireless channel between the second wireless device and a first wireless device, each beam in the first set of beams having a first beam-width, receive, from the first wireless device, a first beam measurement report for a first set of beams, the first beam measurement report indicating a beam sweep order for a second set of beam measurements for a second set of beams, transmit the second set of beams according to the indicated beam sweep order, each beam in the second set of beams having a second beam-width that is narrower than the first beam-width, receive a second beam measurement report from the first wireless device based on the second set of beams, and transmit to the first wireless device an indication of a beam selected for transmissions from the second wireless device based on the first and second beam measurement reports.

Some examples of the method, apparatuses, and non-transitory computer-readable medium described herein may further include operations, features, means, or instructions for receiving, from the first wireless device, an indication related to one or more clusters associated with the one or more of the beams of the second plurality of beams.

Some examples of the method, apparatuses, and non-transitory computer-readable medium described herein may further include operations, features, means, or instructions for performing a time domain correlation of a delay spread for each beam from the first plurality of beams.

Some examples of the method, apparatuses, and non-transitory computer-readable medium described herein may further include operations, features, means, or instructions for assigning a unique receive beam weighting factor to each of two or more receive radio frequency chains of the second wireless device, and identifying, based at least in part on reception with the unique receive beam weighting factor, a received signal strength for each receive radio frequency chain of the two or more receive radio frequency chains.

Some examples of the method, apparatuses, and non-transitory computer-readable medium described herein may further include operations, features, means, or instructions for selecting the beam sweep order based at least in part on the one or more clusters associated with the wireless channel.

In some examples of the method, apparatuses, and non-transitory computer-readable medium described herein, the beam sweep order may include operations, features, means, or instructions for a sequential beam sweep order or a non-sequential beam sweep order for the second set of beams.

In some examples of the method, apparatuses, and non-transitory computer-readable medium described herein, one or more of the first plurality of beams or the second plurality of beams relate to traffic.

In some examples of the method, apparatuses, and non-transitory computer-readable medium described herein, one or more of the first plurality of beams or the second plurality of beams relate to access traffic.

DETAILED DESCRIPTION

Figure 1:
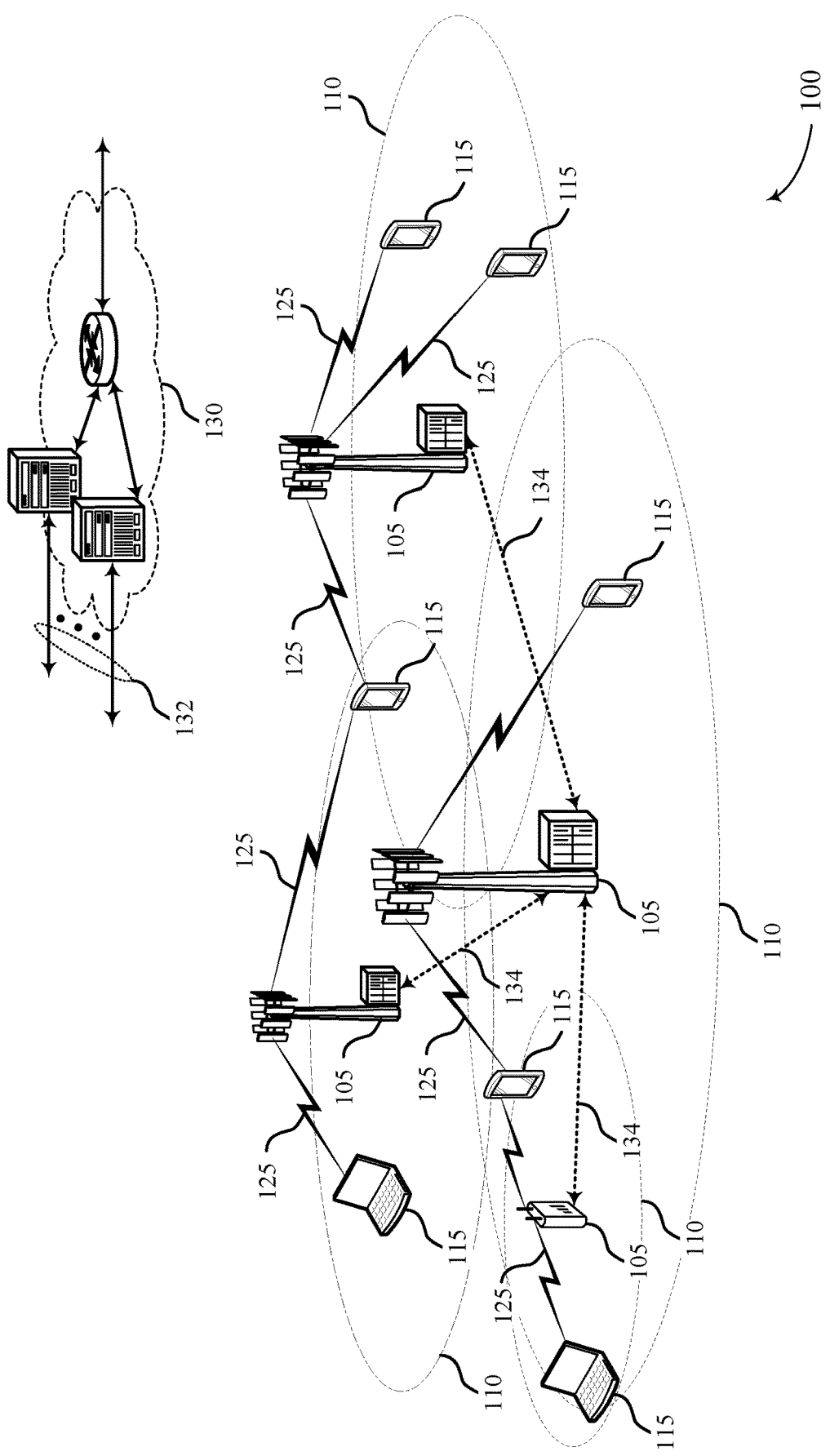
FIGS. 1 and 2 illustrate examples of wireless communications systems that support methods for beam refinement in a millimeter wave (mmW) channel in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams.

mmW wireless networks typically rely on beam management procedures to monitor the performance of active beams and identify candidate beams that can be utilized in the event the active beam becomes unavailable or otherwise unusable. Conventionally, the transmitting device (e.g., a base station and/or a user equipment (UE)) will configure a receiving device (e.g., a UE and/or base station) with a defined number of best beams to be reported in a beam measurement report. The transmitting device transmits beamformed signals in a sweeping manner around its coverage area and the receiving device measures the receive signal levels using one or more receive beams for each transmit beam. The receiving device transmits a beam measure report to the transmitting device that identifies the defined number of best beams, along with their corresponding measured received signal levels (e.g., gain or reference signal received power (RSRP) levels). The transmitting device uses this information when selecting the active beam for continued communications with the receiving device. However, conventional techniques dictate the beam sweep order that is utilized between the transmitting device and the receiving device during beam refinement. The dictated beam sweep order utilizes additional time and/or resources from both the transmitting device and the receiving device, which may be unnecessary in some situations.

Moreover, such conventional techniques do not allow for adequate identification of dominant and sub-dominant clusters located within the wireless channel. For example, there is no mechanism using such conventional beam refinement techniques for the spatial separation between the beams being reported in the beam measurement report to account for sub-dominant clusters that are spatially distinct from each other and/or dominant cluster(s). Moreover, such conventional techniques do not provide a mechanism for the beam width to be adjusted in order to distinguish between clusters that are located proximate to each other, and therefore cannot be distinguished when using a wide beam width for the beam measurements. That is, conventional techniques do not dictate a specific beam sweep order for the transmitting and receiving devices and allow it to be a proprietary or device level implementation. In contrast, to perform some cluster identification during a first beam measurement, in this invention, the receiving device proposes to instruct the transmitting device as to the beam sweep order for second beam measurements in a manner that allows the improvement of sub-dominant cluster identification.

Aspects of the disclosure are initially described in the context of a wireless communication system. Generally, the described techniques provide mechanisms that improve wireless communications in a mmW network. In some aspects, the described techniques provide a mechanism where cluster identification within the wireless channel is improved in order to improve beam selection for ongoing beamformed refinement transmissions. The improved cluster identification may be based, at least in part, on the receiving device instructing or otherwise having an input to the beam sweep order used during the beam refinement process. In some aspects, this may include a receiving device (e.g., a first wireless device in this context) performing a first set of beam measurements for a first plurality of beams over a wireless channel between the receiving device and the transmitting device. In some aspects, the first plurality of beams may have a corresponding first beam width, e.g., may be P1 beams.

The receiving device may transmit a first beam measurement report to the transmitting device for the first plurality of beams. The first beam measurement report may also carry or otherwise convey an indication of a beam sweep order for a second set of beam measurements for a second plurality of beams. For example, the receiving device may identify one or more distinct clusters associated with the one or more beams from the first plurality of beams. For example, the receiving device may perform a time domain correlation of the delay spread for each beam from the first plurality of beams and/or may utilize multiple unique receive beam weighting factors to different radio frequency (RF) receive chains to identify the one or more distinct clusters. Accordingly, the receiving device may use the identified distinct clusters to identify or otherwise determine the beam sweep order to use during a next step in the beam refinement procedure.

The transmitting device may receive the indication of the beam sweep order in the first beam measure report and transmit the second plurality of beams according to the beam sweep order. In some aspects, the second plurality of beams may have a corresponding second beam width that is narrower than the first beam width of the first plurality of beams, e.g., the second plurality of beams may be P2 and/or P3 beams. The receiving device may perform a second set of beam measurements for the second plurality of beams. The receiving device may transmit a second beam measurement report to the transmitting device based on the additional beam measurements. The transmitting device may use the first and/or second beam measurement reports when selecting a beam for communicating with the receiving device. The transmitting device may transmit or otherwise convey an indication of the selected beam to the receiving device.

Particular aspects of the subject matter described herein may be implemented to realize one or more advantages. The described techniques may support improvements in communications using multiple component carriers for communication at a UE, which may improve reliability and throughput, as well as mitigating the effects of time delays between communications over different component carriers, among other advantages. As such, supported techniques may include improved network operations and, in some examples, may promote network efficiencies, among other benefits.

Aspects of the disclosure are further illustrated by and described with reference to apparatus diagrams, system diagrams, and flowcharts that relate to methods for beam refinement in a mmW channel.

FIG. 1 illustrates an example of a wireless communications system 100 that supports methods for beam refinement in a mmW channel in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be coupled with the P-GW. The P-GW may provide IP address allocation as well as other functions. The P-GW may be coupled with the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some examples, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users. Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth. Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable. Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a receiving device (e.g., a first wireless device, which may be an example of a UE 115 and/or a base station 105) may perform a first set of beam measurements for a first plurality of beams over a wireless channel between the first wireless device and a second wireless device, each beam in the first plurality of beams having a first beam-width. The receiving device may transmit to the second wireless device a first beam measurement report for the first plurality of beams, the first beam measurement report indicating a beam sweep order for a second set of beam measurements for a second plurality of beams. The receiving device may perform the second set of beam measurements for the second plurality of beams over the wireless channel according to the indicated beam sweep order, each beam in the second plurality of beams having a second beam-width that is narrower than the first beam-width. The receiving device may transmit to the second wireless device a second beam measurement report based at least in part on the second set of beam measurements. The receiving device may receive from the second wireless device an indication of a beam selection for transmissions from the second wireless device based at least in part on the first and second set of beam measurements.

In some aspects, a transmitting device (e.g., a second wireless device, which may be an example of a UE 115 and/or a base station 105) may transmit a first plurality of beams over a wireless channel between the second wireless device and a first wireless device, each beam in the first plurality of beams having a first beam-width. The transmitting device may receive, from the first wireless device, a first beam measurement report for a first plurality of beams, the first beam measurement report typically reporting the beam indices to be used at the transmitting device and the RSRP for the beam pair. In addition, the beam measurement report may indicate a beam sweep order for a second set of beam measurements for a second plurality of beams. The transmitting device may transmit the second plurality of beams according to the indicated beam sweep order, each beam in the second plurality of beams having a second beam-width that is narrower than the first beam-width. The transmitting device may receive a second beam measurement report from the first wireless device based at least in part on the second plurality of beams. The transmitting device may transmit to the first wireless device an indication of a beam selected for transmissions from the second wireless device based at least in part on the first and second beam measurement reports.

Figure 2:
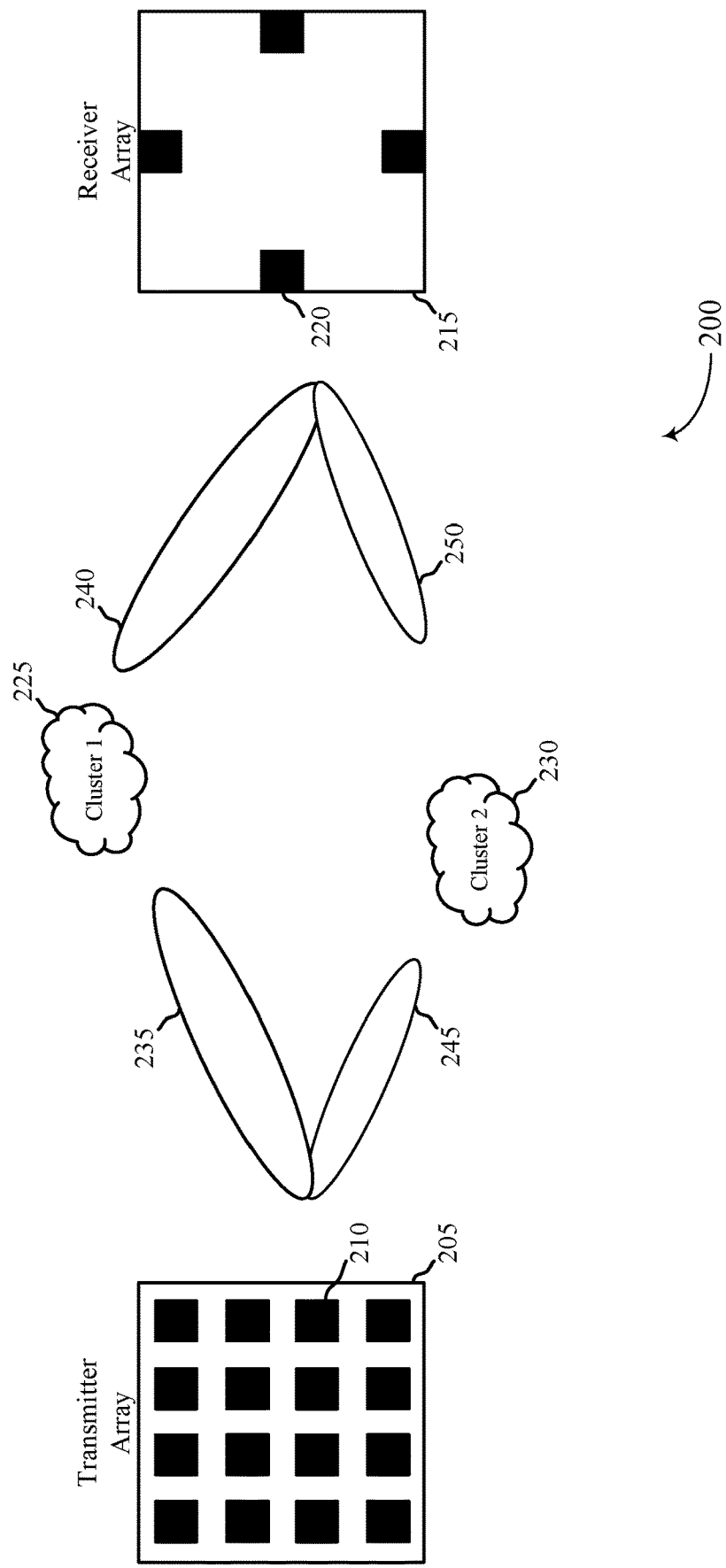

FIG. 2 illustrates an example of a wireless communication system 200 that supports methods for beam refinement in a mmW channel in accordance with aspects of the present disclosure. In some examples, wireless communication system 200 may implement aspects of wireless communications system 100. Aspects of wireless communication system 200 may be implemented by a transmitting device having a transmitter array 205 and a receiving device having a receiver array 215, which may be examples of a base station and/or a UE, as described herein. Generally, the receiving device may refer to a first wireless device and the transmitting device may refer to a second wireless device.

Generally, the transmitting device (e.g., the second wireless device) and the receiving device (e.g., the first wireless device) may be configured to perform wireless communications in a mmW network. For example, the transmitting device may have a transmitter array 205 that includes a plurality of antenna elements 210 that are used by the transmitting device to configure a beamformed signal for wireless transmission to the receiving device. Similarly, the receiving device may have a receiver array 215 that includes a plurality of antenna elements 220 that are used by the receiving device to receive a signal from the transmitting device in a directional manner. The transmitter array 205 may also be used for beamformed reception and the receiver array 215 may be used for transmitting beamformed signals. For example, the transmitting device and the receiving device may utilize digital and/or analog techniques to control one or more of the antenna elements 210 and 220, respectively, in order to perform wireless communications using beamformed signals. Generally, the transmitting device and/or receiving device may utilize such beamforming techniques in a mmW network for access traffic and/or backhaul traffic, such as an integrated access and backhaul (IAB) network.

In some aspects, due to the sparsity of channels (fewer clusters/paths) and the use of larger antenna arrays (e.g., a larger number of antenna elements 210 and/or 220), beamforming in a mmW network is more directional than in sub-6 GHz systems. In some aspects, this may lead to signaling happening over distinct clusters in the wireless channel. Broadly, clusters correspond to objects in the channel environment (e.g., glass windows, lamp posts, building corners, humans, vehicles, etc.) through which distinct forms of electromagnetic propagation could happen (e.g., reflection, diffraction, scattering). The clusters may have multiple paths over a narrow/wide annular spread. Depending on the environment, there could be small (e.g., 1-2) or a large (e.g., 5-7) number of clusters in the channel. For example, and outdoor urban macro environment may correspond to a small number of clusters and an indoor office or mall or industrial environment may correspond to a large number of clusters.

Generally, beamforming and/or beam management techniques in a mmW network may typically include the identification of distinct clusters. For example, clusters may be distinct/spatially separated and therefore can be used for diversity/beam switching in a single-user system (e.g., to overcome blockage) and/or for well-separated/low-interference multi-user beam designs. As another example, multi-beams or beams with energy peaks in multiple directions can be used for spatial multiplexing over an RF chain. These multi-beams may be created by co-phasing beams across distinct clusters and/or beamforming can be performed over multiple RF chains with distinct clusters.

Conventional beamforming and/or beam management techniques typically do a poor job of identifying clusters, such as sub-dominant clusters and/or clusters that are spatially close or proximate to each other. For example, conventional techniques may include the UE reporting beam indices and the RSRP levels to be used by the base station (e.g., in a beam measurement report). In some aspects, this may include use of the P1 beam, e.g., a wider beam width, by both the transmitting device and the receiving device during a first phase of beam refinement, a P2 beam, e.g., a narrower beam width at the transmitting device, being used for a second phase of beam refinement, and a P3 beam, e.g., another narrow beam width beam albeit used at the receiving device, being used for a third phase of beam refinement.

In some aspects, conventional beam management techniques may be based on different beam widths. For example, beam management may use P1/P2/P3 beams, with a P1 beam having a wider beam width than a P2 beam or a P3 beam, e.g., begin with a wide beam width and move to a narrower beam width. In some examples, the P1 beam may be used for transmitting a secondary synchronization block (SSB) signal, whereas a P2/P3 beam may be used for transmitting a channel state information reference signal (CSI RS). Generally, beam management includes the transmitting device transmitting and the receiving device scanning using a codebook of a finite/small size at both the transmitting device and the receiving device. The receiving device determines the RSRP estimates for all beam pairs to form an RSRP table. In some examples, the receiving device may average RSRP values over multiple sub-bands and multiple symbols for SNR enhancement.

Broadly, each entry in the RSRP table may correspond to an RSRP value obtained by the receiving device that corresponds to a particular beam pair. The beam pairing may refer to the transmit beam index from the transmitting device and the receive beam index of the receiving device used to determine the RSRP value. The receiving device creates the RSRP table and identifies the best beams (e.g., the highest RSRP or gain values) to be included in a beam measurement report transmitted to the transmitting device. For each included RSRP value in the measurement report, the receiving device includes the corresponding transmit beam index of the transmitting device, e.g., the transmitting device may be unaware of which receive beam of the receiving device was used to obtain the RSRP value. In some aspects, the transmitting device may configure or otherwise inform the receiving device of how many best beams to report and the beam measurement report, e.g., by signaling or configuring the receiving device to include K best beams in the measurement report.

As one example for conventional beam refinement/cluster identification, existing P1, P2, P3 beam procedures may be used, e.g., a P1 beam may be used over the SSB, with P2/P3 beams being used for a CSI RS. The procedure may use a beam codebook where all entries are for the P1 beam at the transmitting device and the receiving device. The receiving device may obtain or otherwise determine RSRP estimates for all beam pairs (e.g., possibly averaged over multiple sub-bands) to form the RSRP table. In some aspects, this may be used when low latency is necessary to set up a link, where individual peak performance may be obtained slowly. For example, the transmitting device may configure the receiving device to include K (e.g., K=2) RSRP values from the RSRP table to be used to identify the best K beam pairs/clusters. As one non-limiting example, this may be based on:

$$(i_1, j_1) = \arg\max_{i \in I_R, j \in I_T} RSRP_{ij}$$

where $i \in I_R$ refers to the receiver beam index set and $j \in I_T$ refers to the transmitter beam index set. The receiving device may continue creating the RSRP table using:

$$(i_2, j_2) = \arg\max_{i \in I_R, j \in I_T, i \neq i_1, j \neq j_1} RSRP_{ij}$$

and so on up to the value K. Conventionally, the transmitting device and the receiving device may continue to perform beam refinement (e.g., using P2 and P3 beams) on the best beam pairs obtained from the P1 beams. Conventional techniques that use the P1/P2/P3 codebook have too much granularity to ensure that neighbor beams can indicate distinct clusters.

Accordingly, aspects of the described techniques provide a mechanism for improved identification and classification of clusters, such as a first cluster 225 and/or a second cluster 230. Broadly, the described techniques may include the receiving device providing an indication of a beam sweep order to the transmitting device that improves cluster identification during the beam refinement procedure. This may begin by identifying the best cluster in the channel from the RSRP table (e.g., the best beam measurements from a first plurality of beams indicated in the first set of beam measurements) as follows:

$$(i_1, j_1) = \arg\max_{i \in I_R, j \in I_T} RSRP_{ij}$$

where $i \in I_R$ refers to the receiver beam index set and $j \in I_T$ refers to the transmitter beam index set. The receiving device may continue selecting the second beam pair candidate using:

$$(i_2, j_2) = \arg\max_{i \in I_R, j \in I_T, i \neq i_1, j \neq j_1} RSRP_{ij}$$

From this information, the receiving device may create an RSRP table. The receiving device may use the RSRP table (e.g., the first set of beam measurements) to identify one or more distinct clusters associated with the one or more beams of the first plurality of beams. For example, the receiving device may perform a time domain correlation of a delay spread for each beam from the first plurality of beams. Additionally or alternatively, the receiving device may utilize two or more RF chains and assign multiple unique receive beam weighting factors to each RF chain. Based on the weighting factor, the receiving device may identify receive signal strength for each RF chain to identify the one or more distinct clusters.

Based on the identified one or more distinct clusters, a receiving device may determine or otherwise select a beam sweep order to be conveyed to the transmitting device to use during the next step of the beam refinement procedure. Broadly, the beam sweep order may be defined or otherwise be associated with the type of beam, the beam width, the beam direction, and the like, for a second plurality of beams transmitted by the transmitting device during the next step of the beam refinement procedure. As one non-limiting example, the beam measurements for the first plurality of beams (e.g., P1 beams) may identify a first P1 beam pair ($BP_1$) and a second P1 beam pair ($BP_2$). The beam sweep order may be based on the number and/or spatial separation between clusters corresponding to the first P1 beam pair and the second P1 beam pair.

As one example where multiple clusters are identified (e.g., multiple clusters for a beam pair), the beam sweep order for the second set of beam measurements may include a first P2 beam sweep of the first P1 beam pair ($BP_1$) to obtain a first P2 beam pair ($BP_{1'}$) followed by a first P3 beam sweep of the first P2 beam pair ($BP_{1'}$) to obtain a first P3 beam pair ($BP_{1''}$). The beam order may continue with a second P2 beam sweep of the second P1 beam pair ($BP_2$) to obtain a second P2 beam pair ($BP_{2'}$), followed by a second P3 beam sweep of the second P2 beam pair ($BP_{2'}$) to obtain a second P3 beam pair ($BP_{2''}$). In some aspects, this beam sweep order may be considered a non-sequential beam sweep order for the second plurality of beams.

In another example, where a single cluster associated with the first P1 beam pair is identified (e.g., either the first cluster 225 or the second cluster 230), the beam sweep order may include a first P2 beam sweep of the first P1 beam pair ($BP_1$) to obtain a first P2 beam pair ($BP_{1'}$), followed by second P2 beam sweep of the second P1 beam pair ($BP_2$) to obtain a second P2 beam pair ($BP_{2'}$). The beam sweep order may continue with a first P3 beam sweep of the first P2 beam pair ($BP_{1'}$) to obtain a first P3 beam pair ($BP_{1''}$), followed by a second P3 beam sweep of the second P2 beam pair ($BP_{2'}$) to obtain a second P3 beam pair ($BP_{2''}$). In some aspects, this beam sweep order may be considered a sequential beam sweep order for the second plurality of beams.

Accordingly, the receiving device may transmit or otherwise provide an indication of the beam sweep order to the transmitting device, which may use this information when transmitting the second plurality of beams. The receiving device may again perform beam measurements on the second plurality of beams according to the beam sweep order and transmit or otherwise provide a second beam measurement report to the transmitting device based on the second plurality of beams. The transmitting device may use this information when selecting a beam to use for continued communication with the receiving device, and may provide an indication of the selected beam to the receiving device.

In some aspects, this may include the UE (e.g., the receiving device in this example) providing additional feedback information to assist a base station (e.g., the transmitting device in this example) in deciding the precise ordering for a beam refinement. For example, the UE may feed back whether a beam pair found in P1 (e.g., the first plurality of beams, which may be P1 beams) corresponds to a single/ multiple dominant clusters and/or a measure of the number of clusters. The UE can provide this information by determining the following in a P1 sweep: the UE can do a time-domain correlation of the delay spread with the wide beam pair in P1 and/or multiple clusters may be indicated by a longer delay in terms of time-domain correlation versus a more narrow/shorter delay of the time-domain signal with a single cluster. In the situation where the UE has multiple RF chains, the UE can determine the presence of multiple clusters with signal strengths using different receive beam weights over the different RF chains.

In some aspects, this may include the UE indicating which order of P2 and P3 beam sweeps it would like to see from the base station for the different beam pairs found in P1. Such an indication could be based on the UE's measure of the number of clusters in each beam pair of P1. Upon receiving the UE feedback, the base station may provide CSI-RS resources in the specific order that is requested by the UE. For example, the base station may provide a non-sequential beam sweep in the situation where multiple clusters are found in a P1 beam pair or provide a sequential beam sweep otherwise. In some aspects, the base station may simply follow the beam sweep order as indicated by the UE. In some other aspects, the base station may follow a beam sweep order as determined by itself based on feedback information from the UE, inform the UE of this order and follow this specific order.

In some aspects, the described techniques provide a mechanism where the receiving device may indicate to a transmitting device whether a beam pair found in a beam search process corresponds to a single or multiple dominant clusters. The beam pair used in the beam search process corresponds to a wide coverage area beams or beams used in a P1 sweep of the 5G-NR beam search process. The indication made by the receiving device may be based on a time-correlation of the delay spread with the beam pair. In some aspects, a longer delay spread in the time-domain correlation may be indicative of multiple dominant clusters, whereas a shorter delay spread may be indicative of a single dominant cluster. In some aspects, the indication provided by the receiving device may be made by estimating the signal strengths with multiple RF chains at the receiving device.

In some aspects, the receiving device may select a specific beam refinement ordering (e.g., beam sweep order) to be used by the transmitting device and subsequent beam refinement following the procedure performed in a P1 beam sweep of the 5G-NR beam search process, and indicating this ordering to the transmitting device. In some aspects, the transmitting device may select a beam refinement ordering to be used by itself and at the receiving device in response to the indication of the beam sweep order. In the situation where multiple clusters are indicated for a beam pair used in the first beam measurement report, the receiving device performs a P2 and a P3 sweep of the 5G-NR beam search process before proceeding to other beam refinements. In the situation where a single cluster is indicated for all the beam pairs used in the first beam measurement report, a P2 sweep for these beam pairs may be performed first before performing a P3 sweep for the refined beam pairs. In some aspects, the receiving device may be an example of a UE and/or a base station, and the transmitting device may be an example of a base station.

Figure 3:
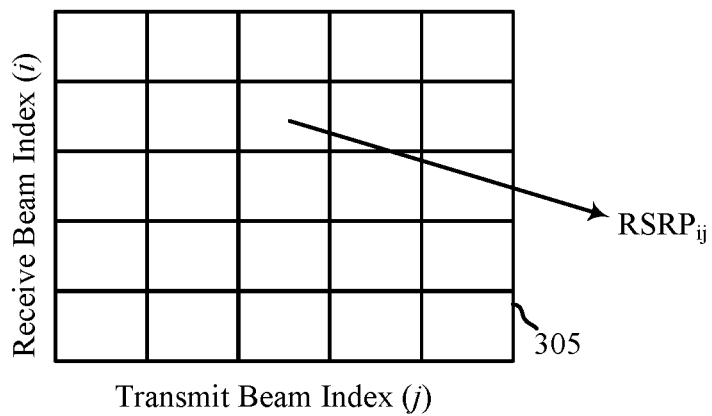
FIG. 3 illustrates an example of a reference signal received power (RSRP) table that supports methods for beam refinement in a mmW channel in accordance with aspects of the present disclosure.

FIG. 3 illustrates an example of a RSRP table 300 that supports methods for beam refinement in a mmW channel in accordance with aspects of the present disclosure. In some examples, RSRP table 300 may implement aspects of wireless communication systems 100 and/or 200. Aspects of RSRP table 300 may be implemented by a receiving device (e.g., a first wireless device) and/or a transmitting device (e.g., a second wireless device), which may be examples of a base station and/or a UE as is described herein.

Generally, RSRP table 300 may be developed by a receiving device and/or transmitting device based on beam measurements performed over a wireless channel between the receiving device and the transmitting device. Broadly, each row may correspond to a receive beam index (i) whereas each column may correspond to a transmit beam index (j). For each receive beam index and transmit beam index, the receiving device may measure or otherwise determine an RSRP value 305 (e.g., a gain value) for the corresponding beam pair. For example, the receiving device may, for each transmit beam index, measure a receive signal level using an available set of receive beams corresponding to the receive beam indices to determine the RSRP value 305. In some aspects, the receiving device may select from the RSRP table 300 the best-K beam pairs to report in the corresponding beam measurement report. In the example illustrated in FIG. 3, this may include 5 potential receive beams and 5 potential transmit beams, resulting in the corresponding RSRP table 300 having 25 RSRP values 305. It is to be understood that different size RSRP tables 300 may be used.

As discussed above, the receiving device may include an indication of the best-K beams in its first beam measurement report and/or in its second beam measurement report to the transmitting device. Generally, the best-K beams may be identified based on the RSRP table 300. For example, a transmitting device may transmit a first plurality of beams (with each beam in the first plurality of beam corresponding to a transmit beam index) over a wireless channel between the transmitting device and a receiving device. Each transmit beam within the first plurality of beams may have a corresponding first beam width (e.g., may be P1 beams).

The receiving device may perform a first set of beam measurements on the first plurality of beams and transmit a first beam measurement report to the transmitting device for the first plurality of beams. The first beam measurement report may carry or convey an indication of a beam sweep order for a second set of beam measurements for a second plurality of beams. For example, the receiving device may identify one or more clusters located in the wireless channel that correspond to the best-K beams indicated in the first beam measurement report. The receiving device may select the beam sweep order based on the identified one or more clusters. The transmitting device may receive the indication of the beam sweep order and transmit the second plurality of beams according to the beam sweep order. The second plurality of beams may correspond to each transmit beam index, and may have a corresponding second beam width that is narrower than the beam width of the first plurality of beams, e.g., may be P2 and/or P3 beams. The receiving device may perform a second set of beam measurements for the second plurality of beams according to the indicated beam sweep order and transmit a second beam measure report to the transmitting device based at least in part on the second set of beam measurements. The transmitting device may use this information (e.g., the first and/or second beam measurement reports) when selecting a beam for continued can communications with the receiving device. The transmitting device may transmit or otherwise provide an indication of the selected beam to the receiving device.

Figure 4A:
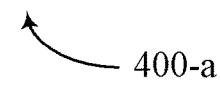
FIGS. 4A and 4B illustrate example of a beam sweep orders that supports methods for beam refinement in a mmW channel in accordance with aspects of the present disclosure.
Figure 4B:
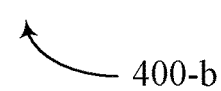

FIG. 4 illustrates an example of a beam sweep orders 400 that supports methods for beam refinement in a mmW channel in accordance with aspects of the present disclosure. In some examples, beam sweep orders 400 may implement aspects of wireless communication systems 100 and/or 200, and/or RSRP table 300. Aspects of beam sweep orders 400 may be implement a by a receiving device and/or transmitting device, which may be examples of the UE and/or a base station is described herein.

As discussed, the receiving device may generally perform a first set of beam measurements for a first plurality of beams over wireless channel between the receiving device and a transmitting device, with each beam in the first plurality of beams may having a corresponding first beam width and, in some examples, may be P1 beams. The receiving device may transmit a first beam measurement report to the transmitting device for the first plurality of beams. In some aspects, the first beam measurement report may carry or convey an indication of a beam sweep order for a second set of measurements for a second plurality of beams. Generally, beam sweep orders 400 illustrates two examples of the beam sweep order used for the second set of measurements for the second plurality of beams.

For example, beam sweep order 400-$a$ may be implemented in the situation where a single cluster is indicated for all of the beam pairs indicated in the first beam measurement report. Accordingly, the beam sweep order 400-$a$ may include a first step 405 that includes a first P2 beam sweep of the first P1 beam pair ($BP_1$) to obtain a first P2 beam pair ($BP_{1'}$). This may be followed by a second step 410 that includes a second P2 beam sweep of the second P1 beam pair ($BP_2$) to obtain a second P2 beam pair ($BP_{2'}$). This may be followed by a third step 415 that includes a first P3 beam sweep of the first P2 beam pair ($BP_{1'}$) to obtain a first P3 beam pair ($BP_{1''}$). This may be followed by a fourth step 420 that includes a second P3 beam sweep of the second P2 beam pair ($BP_{2'}$) to obtain a second P3 beam pair ($BP_{2''}$).

For example, beam sweep order 400-$b$ may be implemented in the situation where multiple clusters are indicated for a beam pair used in the first beam measurement report. Accordingly, beam sweep order 400-$b$ may include a first step 425 that includes a first P2 beam sweep of the first P1 beam pair ($BP_1$) to obtain a first P2 beam pair ($BP_{1'}$). This may be followed by a second step 430 that includes a first P3 beam sweep of the first P2 beam pair ($BP_{1'}$) to obtain a first P3beam pair ($BP_{1''}$). This may be followed by a third step 435 that includes a second P2 beam sweep of the second P1 beam pair ($BP_2$) to obtain a second P2 beam pair ($BP_{2'}$). This may be followed by a fourth step 440 that includes a second P3 beam sweep of the second P2 beam pair ($BP_{2'}$) to obtain a second P3 beam pair ($BP_{2''}$).

As discussed, the receiving device may transmit an indication of the requested beam sweep order to be used by the transmitting device, which may use the indicated beam sweep order when transmitting the second plurality of beams, e.g., the P2 and/or P3 beams depending on the beam sweep order. The receiving device may perform a second set of beam measurements on the second plurality of beams according to the indicated beam sweep order and transmit a second beam measurement report to the transmitting device based on the second set of beam measurements. The transmitting device may use the first and/or second beam measurement reports to select a beam for transmissions to the receiving device, and transmit or otherwise provide an indication of this beam to the receiving device.

Accordingly, beam sweep orders 400 may be implemented in the situation where the transmitting device determines the two best beam pairs ($BP_1$ and $BP_2$) in the channel based on the P1 procedure (e.g., as indicated in the first beam measurement report). Beam sweep orders 400 illustrates two possibilities for beam sweep orders that may be utilized, with beam sweep order 400-a illustrating an example where the base station performs a P2 beam sweep on $BP_1$ and $BP_2$ followed by a P3 beam sweep, and beam sweep order 400-b illustrating an example where the base station first performs P2 and P3 beam sweep procedure on $BP_1$, followed by P2 and P3 beam sweep procedure on $BP_2$.

Figure 5:
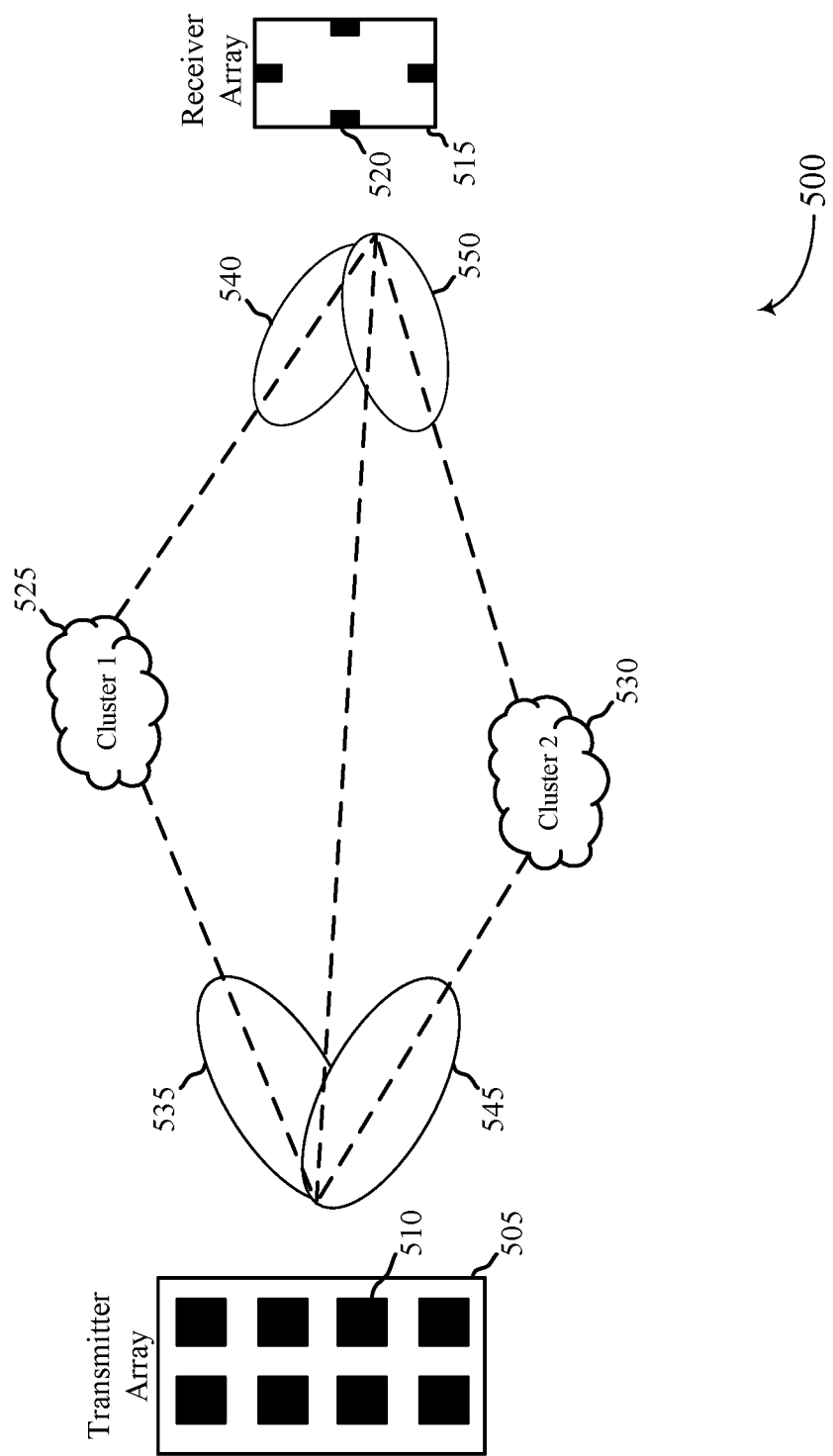
FIGS. 5 and 6 illustrate examples of wireless communications systems that support methods for beam refinement in a mmW channel in accordance with aspects of the present disclosure.

FIG. 5 illustrates an example of a wireless communication system 500 that supports methods for beam refinement in a mmW channel in accordance with aspects of the present disclosure. In some examples, wireless communication system 500 may implement aspects of wireless communications systems 100 and/or 200, RSRP table 300, and/or beam sweep orders 400. Aspects of wireless communication system 500 may be implemented by a transmitting device having a transmitter array 505 and a receiving device having a receiver array 515, which may be examples of a base station and/or a UE, as described herein. Generally, the receiving device may refer to a first wireless device and the transmitting device may refer to a second wireless device.

Generally, the transmitting device (e.g., the second wireless device) and the receiving device (e.g., the first wireless device) may be configured to perform wireless communications in a mmW network. For example, the transmitting device may have a transmitter array 505 that includes a plurality of antenna elements 510 that are used by the transmitting device to configure a beamformed signal for wireless transmission to the receiving device. Similarly, the receiving device may have a receiver array 515 that includes a plurality of antenna elements 520 that are used by the receiving device to receive a signal from the transmitting device in a directional manner. The transmitter array 505 may also be used for beamformed reception and the receiver array 515 may be used for transmitting beamformed signals. For example, the transmitting device and the receiving device may utilize digital and/or analog techniques to control one or more of the antenna elements 510 and 520, respectively, in order to perform wireless communications using beamformed signals. Generally, the transmitting device and/or receiving device may utilize such beamforming techniques in a mmW network for access traffic and/or backhaul traffic, such as an IAB network.

Generally, wireless communication system 500 illustrates example where each of $BP_1$ and $BP_2$ correspond to a single dominant cluster, e.g., $BP_1$ corresponds to a first cluster 525 and $BP_2$ corresponds to a second cluster 530. In some aspects, $BP_1$ may refer to transmit beam 535 from the transmitting device and receive beam 540 from the receiving device, which correspond to the first cluster 525. In some aspects, $BP_2$ may refer to transmit beam 545 from the transmitting device and receive beam 550 from the receiving device, which corresponds to the second cluster 530. In some aspects, one or more of beams 535 and 545 may correspond to P1 beams, with beams 540 and 550 corresponding to the receive beams used by the receiving device to calculate the RSRP value for $BP_1$ and $BP_2$, respectively.

In some aspects, the receiving device may determine that $BP_1$ corresponds to the first cluster 525 and that $BP_2$ corresponds to the second cluster 530, and therefore identify or otherwise select a beam sweep order for a second plurality of beams based on this determination. In one scenario utilizing either beam sweep order 400-a or beam sweep order 400-b may utilize the same amount of time/beam refinement opportunities to discover the first cluster 525 and the second cluster 530. However, the receiving device selecting beam sweep or 400-a may be a more suitable selection from the receiving device blockage perspective as it keeps the receiving device beam wider (e.g., to combat blockage by a user holding the receiving device) before discovering/refining the alternate beam pairs to switch to if the receiving device is blocked in the interim period.

Accordingly, the receiving device may transmit or otherwise provide an indication of the selected beam sweep order (e.g., beam sweep order 400-a) to the transmitting device in a first beam measurement report (or in conjunction with the first beam measurement report). The transmitting device may receive the indication of the beam sweep order being requested by the receiving device and transmit a second plurality of beams over the wireless channel according to the beam sweep order. The receiving device may perform a second set of beam measurements on the second plurality of beams and transmit or otherwise provide an indication of a second beam measurement report to the transmitting device based at least in part on the second set of beam measurements. The transmitting device may use this information, along with the information indicated in the first beam measurement report, when selecting a beam for transmissions to the receiving device. The transmitting device may transmit or otherwise provide an indication of the selected beam to the receiving device.

Figure 6:
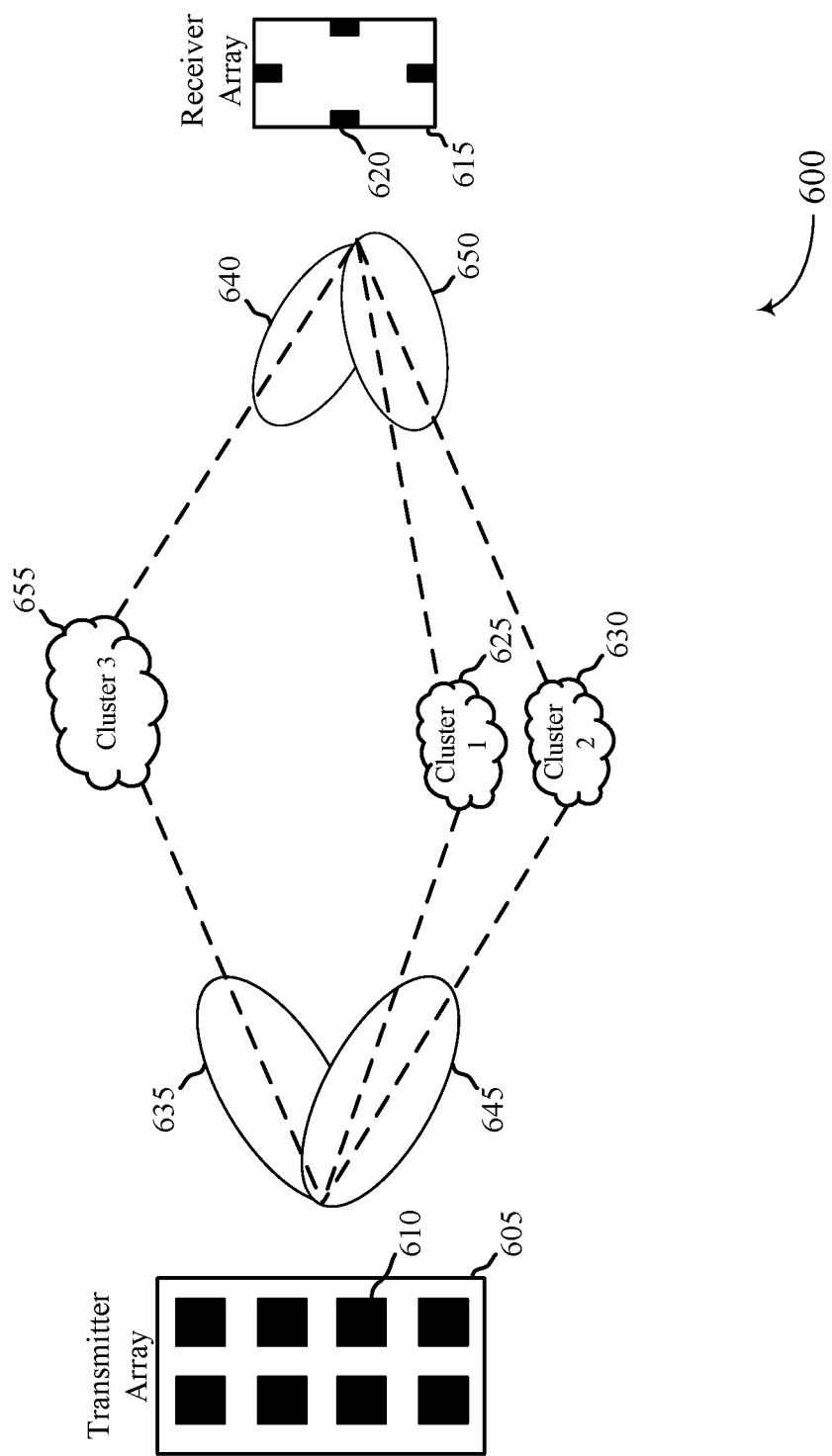

FIG. 6 illustrates an example of a wireless communication system 600 that supports methods for beam refinement in a mmW channel in accordance with aspects of the present disclosure. In some examples, wireless communication system 600 may implement aspects of wireless communications systems 100, 200, and/or 500, RSRP table 300, and/or beam sweep orders 400. Aspects of wireless communication system 600 may be implemented by a transmitting device having a transmitter array 605 and a receiving device having a receiver array 615, which may be examples of a base station and/or a UE, as described herein. Generally, the receiving device may refer to a first wireless device and the transmitting device may refer to a second wireless device.

Generally, the transmitting device (e.g., the second wireless device) and the receiving device (e.g., the first wireless device) may be configured to perform wireless communications in a mmW network. For example, the transmitting device may have a transmitter array 605 that includes a plurality of antenna elements 610 that are used by the transmitting device to configure a beamformed signal for wireless transmission to the receiving device. Similarly, the receiving device may have a receiver array 615 that includes a plurality of antenna elements 620 that are used by the receiving device to receive a signal from the transmitting device in a directional manner. The transmitter array 605 may also be used for beamformed reception and the receiver array 615 may be used for transmitting beamformed signals. For example, the transmitting device and the receiving device may utilize digital and/or analog techniques to control one or more of the antenna elements 610 and 620, respectively, in order to perform wireless communications using beamformed signals. Generally, the transmitting device and/or receiving device may utilize such beamforming techniques in a mmW network for access traffic and/or backhaul traffic, such as an IAB network.

Generally, wireless communication system 600 illustrates example where of $BP_1$ corresponds to two or more dominant clusters (e.g., the first cluster 625 and the second cluster 630) and $BP_2$ correspond to a single dominant cluster (e.g., the third cluster 655). In some aspects, $BP_1$ may refer to transmit beam 645 from the transmitting device and receive beam 650 from the receiving device, which correspond to the first cluster 625 and the second cluster 630. In some aspects, $BP_2$ may refer to transmit beam 635 from the transmitting device and receive beam 640 from the receiving device, which corresponds to the third cluster 655. In some aspects, one or more of beams 635 and 645 may correspond to P1 beams, with beams 640 and 650 corresponding to the receive beams used by the receiving device to calculate the RSRP value for $BP_1$ and $BP_2$, respectively.

In some aspects, since $BP_1$ and $BP_2$ are wide beams (e.g., or P1 beams that each have a wide beam width, such as the first beam width) they may cover a relatively large area, e.g., may cover up to 1000. $BP_1$ may capture two (or more) clusters in the channel (e.g., the first cluster 625 and the second cluster 630) while $BP_2$ may capture a weaker cluster (e.g., the third cluster 655). In some aspects, the receiving device may determine that $BP_1$ corresponds to the first cluster 625 and the second cluster 630 and that $BP_2$ corresponds to the third cluster 655, and therefore identify or otherwise select a beam sweep order for a second plurality of beams based on this determination. In one scenario, utilizing beam sweep order 400-b may result in improved discovery of the two (or more) dominant clusters corresponding to $BP_1$, leading to an early stop in the beam refinement procedure. Accordingly, the receiving device selecting the beam sweep order 400-b may save time and/or resources (e.g., such as battery power) in the beam refinement/beam management procedure. In some aspects, beam sweep order 400-a may waste beam refinement opportunities in this scenario (e.g., in the scenario where $BP_1$ corresponds to two or more clusters).

Accordingly, the receiving device may transmit or otherwise provide an indication of the selected beam sweep order (e.g., beam sweep order 400-b) to the transmitting device in a first beam measurement report (or in conjunction with the first beam measurement report). The transmitting device may receive the indication of the beam sweep order being requested by receiving device and transmit a second plurality of beams over the wireless channel according to the beam sweep order. The receiving device may perform a second set of beam measurements on the second plurality of beams and transmit or otherwise provide an indication of a second beam measurement report to the transmitting device based at least in part on the second set of beam measurements. The transmitting device may use this information, along with the information indicated in the first beam measurement report, when selecting a beam for transmissions to the receiving device. The transmitting device may transmit or otherwise provide an indication of the selected beam to the receiving device.

Figure 7:
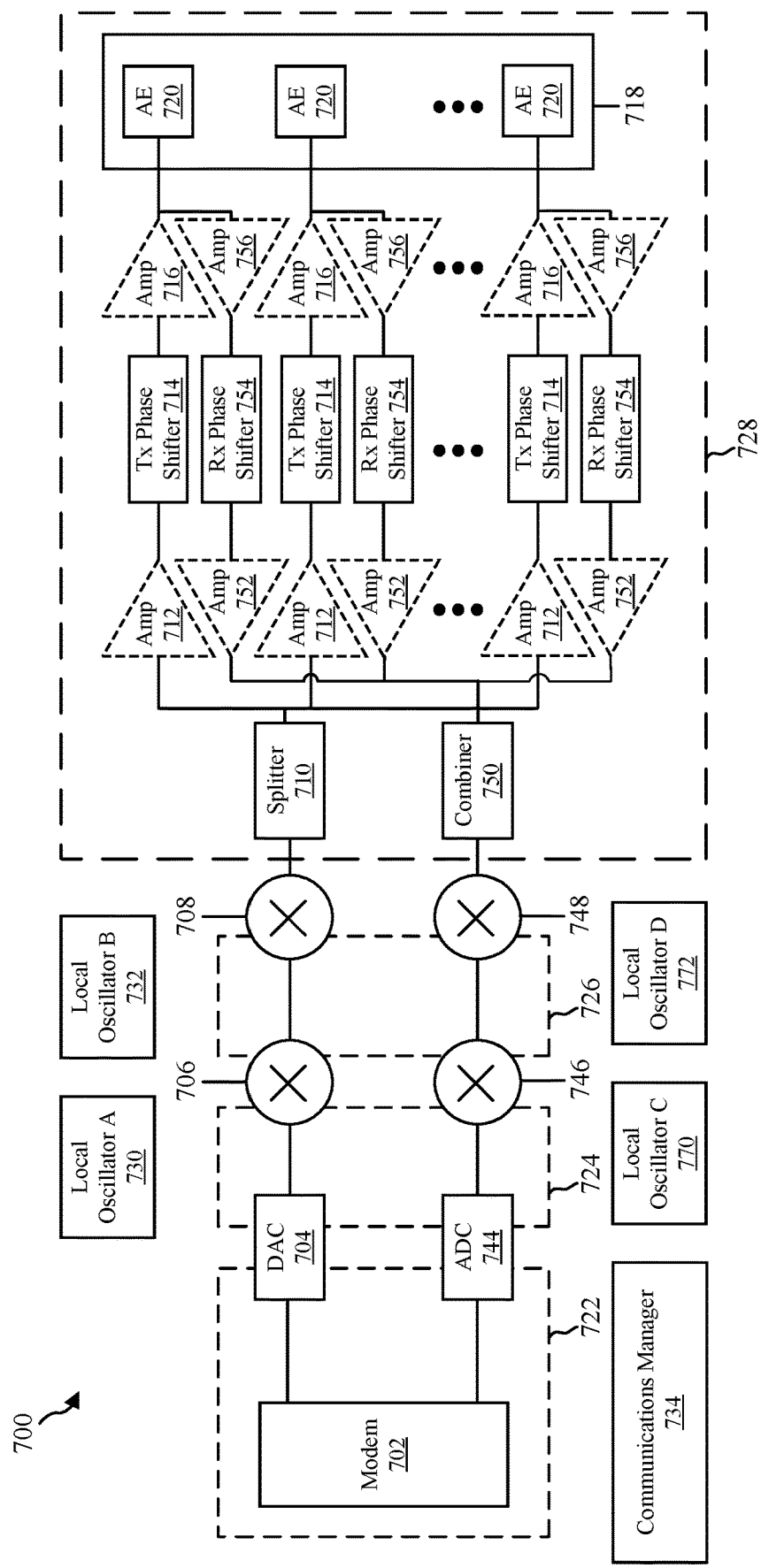
FIG. 7 illustrates an example of an architecture that supports methods for beam refinement in a mmW channel in accordance with aspects of the present disclosure.

FIG. 7 illustrates an example of an architecture 700 that supports methods for beam refinement in a mmW channel in accordance with aspects of the present disclosure. In some examples, architecture 700 may implement aspects of wireless communication systems 100, 200, 500, and/or 600, RSRP tables 300, and/or beam sweep orders 400. In some aspects, architecture 700 may be an example of the receiving device (e.g., a first wireless device) and/or a transmitting device (e.g., a second wireless device), as described herein.

Broadly, FIG. 7 is a diagram illustrating example hardware components of a wireless device in accordance with some aspects of the disclosure. The illustrated components may include those that may be used for antenna element selection and/or for beamforming for transmission of wireless signals. There are numerous architectures for antenna element selection and implementing phase shifting, one example of which is illustrated here. The architecture 700 includes a modem (modulator/demodulator) 702, a digital to analog converter (DAC) 704, a first mixer 706, a second mixer 708, and a splitter 710. The architecture 700 also includes a plurality of first amplifiers 712, a plurality of phase shifters 714, a plurality of second amplifiers 716, and an antenna array 718 that includes a plurality of antenna elements 720. Transmission lines or other waveguides, wires, traces, or the like are shown connecting the various components to illustrate how signals to be transmitted may travel between components. Boxes 722, 724, 726, and 728 indicate regions in the architecture 700 in which different types of signals travel or are processed. Specifically, box 722 indicates a region in which digital baseband signals travel or are processed, box 724 indicates a region in which analog baseband signals travel or are processed, box 726 indicates a region in which analog intermediate frequency (IF) signals travel or are processed, and box 728 indicates a region in which analog radio frequency an RF signals travel or are processed. The architecture also includes a local oscillator A 730, a local oscillator B 732, and a communications manager 734.

Each of the antenna elements 720 may include one or more sub-elements (not shown) for radiating or receiving RF signals. For example, a single antenna element 720 may include a first sub-element cross-polarized with a second sub-element that can be used to independently transmit cross-polarized signals. The antenna elements 720 may include patch antennas or other types of antennas arranged in a linear, two dimensional, or other pattern. A spacing between antenna elements 720 may be such that signals with a desired wavelength transmitted separately by the antenna elements 720 may interact or interfere (e.g., to form a desired beam). For example, given an expected range of wavelengths or frequencies, the spacing may provide a quarter wavelength, half wavelength, or other fraction of a wavelength of spacing between neighboring antenna elements 720 to allow for interaction or interference of signals transmitted by the separate antenna elements 720 within that expected range.

The modem 702 processes and generates digital baseband signals and may also control operation of the DAC 704, first mixer 706, second mixer 708, splitter 710, first amplifiers 712, phase shifters 714, and/or the second amplifiers 716 to transmit signals via one or more or all of the antenna elements 720. The modem 702 may process signals and control operation in accordance with a communication standard such as a wireless standard discussed herein. The DAC 704 may convert digital baseband signals received from the modem 702 (and that are to be transmitted) into analog baseband signals. The first mixer 706 upconverts analog baseband signals to analog IF signals within an IF using a local oscillator A 730. For example, the first mixer 706 may mix the signals with an oscillating signal generated by the local oscillator A 730 to "move" the baseband analog signals to the IF. In some cases, some processing or filtering (not shown) may take place at the IF. The second mixer 708 upconverts the analog IF signals to analog RF signals using the local oscillator B 732. Similarly to the first mixer, the second mixer 708 may mix the signals with an oscillating signal generated by the local oscillator B 732 to "move" the IF analog signals to the RF, or the frequency at which signals will be transmitted or received. The modem 702 and/or the communications manager 734 may adjust the frequency of local oscillator A 730 and/or the local oscillator B 732 so that a desired IF and/or RF frequency is produced and used to facilitate processing and transmission of a signal within a desired bandwidth.

In the illustrated architecture 700, signals upconverted by the second mixer 708 are split or duplicated into multiple signals by the splitter 710. The splitter 710 in architecture 700 splits the RF signal into a plurality of identical or nearly identical RF signals, as denoted by its presence in box 728. In other examples, the split may take place with any type of signal including with baseband digital, baseband analog, or IF analog signals. Each of these signals may correspond to an antenna element 720 and the signal travels through and is processed by amplifiers 712, 716, phase shifters 714, and/or other elements corresponding to the respective antenna element 720 to be provided to and transmitted by the corresponding antenna element 720 of the antenna array 718. In one example, the splitter 710 may be an active splitter that is coupled with a power supply and provides some gain so that RF signals exiting the splitter 710 are at a power level equal to or greater than the signal entering the splitter 710. In another embodiment, the splitter 710 is a passive splitter that is not coupled with power supply and the RF signals exiting the splitter 710 may be at a power level lower than the RF signal entering the splitter 710.

After being split by the splitter 710, the resulting RF signals may enter an amplifier, such as a first amplifier 712, or a phase shifter 714 corresponding to an antenna element 720. The first and second amplifiers 712, 716 are illustrated with dashed lines because one or both of them might not be necessary in some implementations. In one implementation, both the first amplifier 712 and second amplifier 714 are present. In another, neither the first amplifier 712 nor the second amplifier 714 is present. In other implementations, one of the two amplifiers 712, 714 is present but not the other. By way of example, if the splitter 710 is an active splitter, the first amplifier 712 may not be used. By way of further example, if the phase shifter 714 is an active phase shifter that can provide a gain, the second amplifier 716 might not be used. The amplifiers 712, 716 may provide a desired level of positive or negative gain. A positive gain (positive dB) may be used to increase an amplitude of a signal for radiation by a specific antenna element 720. A negative gain (negative dB) may be used to decrease an amplitude and/or suppress radiation of the signal by a specific antenna element. Each of the amplifiers 712, 716 may be controlled independently (e.g., by the modem 702 or communications manager 734) to provide independent control of the gain for each antenna element 720. For example, the modem 702 and/or the communications manager 734 may have at least one control line coupled with each of the splitter 710, first amplifiers 712, phase shifters 714, and/or second amplifiers 716 which may be used to configure a gain to provide a desired amount of gain for each component and thus each antenna element 720.

The phase shifter 714 may provide a configurable phase shift or phase offset to a corresponding RF signal to be transmitted. The phase shifter 714 could be a passive phase shifter not directly coupled with a power supply. Passive phase shifters might introduce some insertion loss. The second amplifier 716 could boost the signal to compensate for the insertion loss. The phase shifter 714 could be an active phase shifter coupled with a power supply such that the active phase shifter provides some amount of gain or prevents insertion loss. The settings of each of the phase shifters 714 are independent meaning that each can be set to provide a desired amount of phase shift or the same amount of phase shift or some other configuration. The modem 702 and/or the communications manager 734 may have at least one control line coupled with each of the phase shifters 714 and which may be used to configure the phase shifters 714 to provide a desired amounts of phase shift or phase offset between antenna elements 720.

The architecture 700 is given by way of example only to illustrate an architecture for transmitting and/or receiving signals. It will be understood that the architecture 700 and/or each portion of the architecture 700 may be repeated multiple times within an architecture to accommodate or provide an arbitrary number of RF chains, antenna elements, and/or antenna panels. Furthermore, numerous alternate architectures are possible and contemplated. For example, although only a single antenna array 718 is shown, two, three, or more antenna arrays may be included each with one or more of their own corresponding amplifiers, phase shifters, splitters, mixers, DACs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 722, 724, 726, 728) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 710, amplifiers 712, 716, or phase shifters 714 may be located between the DAC 704 and the first mixer 706 or between the first mixer 706 and the second mixer 708.

In one example, the functions of one or more of the components may be combined into one component. For example, the phase shifters 714 may perform amplification to include or replace the first and/or second amplifiers 712, 716, respectively. By way of another example, a phase shift may be implemented by the second mixer 708 to obviate the need for a separate phase shifter 714. This technique is sometimes called local oscillator phase shifting. In one implementation of this configuration, there may be a plurality of IF to RF mixers (e.g., for each antenna element chain) within the second mixer 708 and the local oscillator B 732 would supply different local oscillator signals (with different phase offsets) to each IF to RF mixer.

The modem 702 and/or the communications manager 734 may control one or more of the other components 704-720 to select one or more antenna elements 720 and/or to form beams for transmission of one or more signals. For example, the antenna elements 720 may be individually selected or deselected for transmission of a signal (or signals) by controlling an amplitude of one or more corresponding amplifiers, such as the first amplifiers 712 and/or the second amplifiers 716. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 720, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 718) can be dynamically controlled by modifying the phase shifts or phase offsets imparted by the phase shifters 714 and amplitudes imparted by the amplifiers 712, 716 of the plurality of signals relative to each other.

The communications manager 734 may, when architecture 700 is configured as a receiving device, perform a first set of beam measurements for a first plurality of beams over a wireless channel between the first wireless device and a second wireless device, each beam in the first plurality of beams having a first beam-width. The communications manager 734 may transmit to the second wireless device a first beam measurement report for the first plurality of beams, the first beam measurement report indicating a beam sweep order for a second set of beam measurements for a second plurality of beams. The communications manager 734 may perform the second set of beam measurements for the second plurality of beams over the wireless channel according to the indicated beam sweep order, each beam in the second plurality of beams having a second beam-width that is narrower than the first beam-width. The communications manager 734 may transmit to the second wireless device a second beam measurement report based at least in part on the second set of beam measurements. The communications manager 734 may receive from the second wireless device an indication of a beam selection for transmissions from the second wireless device based at least in part on the first and second set of beam measurements.

The communications manager 734, when architecture 700 is configured as a transmitting device, may transmit a first plurality of beams over a wireless channel between the second wireless device and a first wireless device, each beam in the first plurality of beams having a first beam-width. The communications manager 734 may receive, from the first wireless device, a first beam measurement report for a first plurality of beams, the first beam measurement report indicating a beam sweep order for a second set of beam measurements for a second plurality of beams. The communications manager 734 may transmit the second plurality of beams according to the indicated beam sweep order, each beam in the second plurality of beams having a second beam-width that is narrower than the first beam-width.

The communications manager 734 may receive a second beam measurement report from the first wireless device based at least in part on the second plurality of beams. The communications manager 734 may transmit to the first wireless device an indication of a beam selected for transmissions from the second wireless device based at least in part on the second beam measurement report. The communications manager 734 may be located partially or fully within one or more other components of the architecture 700. For example, the communications manager 734 may be located within the modem 702 in at least one implementation.

Figure 8:
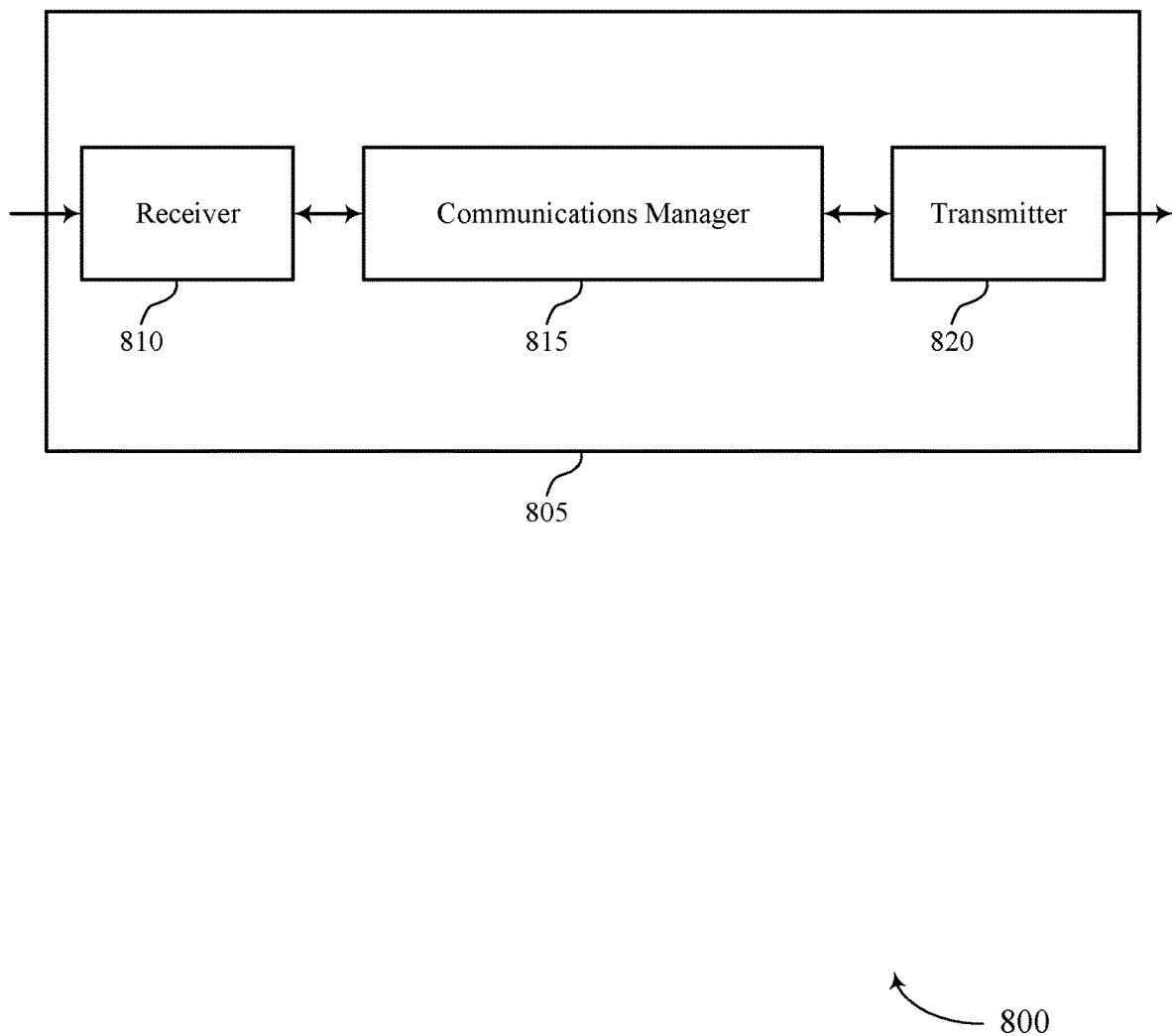
FIGS. 8 and 9 show block diagrams of devices that support methods for beam refinement in a mmW channel in accordance with aspects of the present disclosure.

FIG. 8 shows a block diagram 800 of a device 805 that supports methods for beam refinement in a mmW channel in accordance with aspects of the present disclosure. The device 805 may be an example of aspects of a UE 115 or base station 105 as described herein. The device 805 may include a receiver 810, a communications manager 815, and a transmitter 820. The device 805 may also include a processor. Each of these components may be in communication with one another (e.g., via one or more buses). Receiver 810 may receive information such as packets, user data, or control information associated with various information channels (e.g., control channels, data channels, and information related to methods for beam refinement in a mmW channel, etc.). Information may be passed on to other components of the device 805. The receiver 810 may be an example of aspects of the transceiver 1120 or 1220 as described with reference to FIGS. 11 and 12. The receiver 810 may utilize a single antenna or a set of antennas.

The communications manager 815 may perform a first set of beam measurements for a first set of beams over a wireless channel between the first wireless device and a second wireless device, each beam in the first set of beams having a first beam-width, perform the second set of beam measurements for the second set of beams over the wireless channel according to the indicated beam sweep order, each beam in the second set of beams having a second beam-width that is narrower than the first beam-width, transmit to the second wireless device a first beam measurement report for the first set of beams, the first beam measurement report indicating a beam sweep order for a second set of beam measurements for a second set of beams, transmit to the second wireless device a second beam measurement report based on the second set of beam measurements, and receive from the second wireless device an indication of a beam selection for transmissions from the second wireless device based on the second set of beam measurements.

The communications manager 815 may also transmit a first set of beams over a wireless channel between the second wireless device and a first wireless device, each beam in the first set of beams having a first beam-width, transmit the second set of beams according to the indicated beam sweep order, each beam in the second set of beams having a second beam-width that is narrower than the first beam-width, receive, from the first wireless device, a first beam measurement report for a first set of beams, the first beam measurement report indicating a beam sweep order for a second set of beam measurements for a second set of beams, receive a second beam measurement report from the first wireless device based on the second set of beams, and transmit to the first wireless device an indication of a beam selected for transmissions from the second wireless device based on the second beam measurement report. The communications manager 815 may be an example of aspects of the communications manager 1110 or 1210 as described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure. Transmitter 820 may transmit signals generated by other components of the device 805. In some examples, the transmitter 820 may be collocated with a receiver 810 in a transceiver module. For example, the transmitter 820 may be an example of aspects of the transceiver 1120 or 1220 as described with reference to FIGS. 11 and 12. The transmitter 820 may utilize a single antenna or a set of antennas.

In some examples, the communications manager 815 may be implemented as an integrated circuit or chipset for a mobile device modem, and the receiver 810 and transmitter 820 may be implemented as analog components (e.g., amplifiers, filters, antennas) coupled with the mobile device modem to enable wireless transmission and reception over one or more bands. The communications manager 815 as described herein may be implemented to realize one or more potential advantages. One implementation may allow the device 805 to perform a throughput degradation technique based on a time delay between communications received over multiple component carriers. The throughput degradation technique may involve the device 805 limiting CQI, RI, or other parameters in a CSF, which may improve throughput. Such techniques also may mitigate the effects of the time delay between component carriers. Based on techniques for implementing sidelink groupcast reachability based scheduling as described herein, a processor of a UE 115 (e.g., controlling the receiver 810, the transmitter 820, or the transceiver 1120 as described with reference to FIGS. 11 and 12) may increase reliability and throughput when utilizing multiple component carriers in a carrier aggregation communications scheme.

Figure 9:
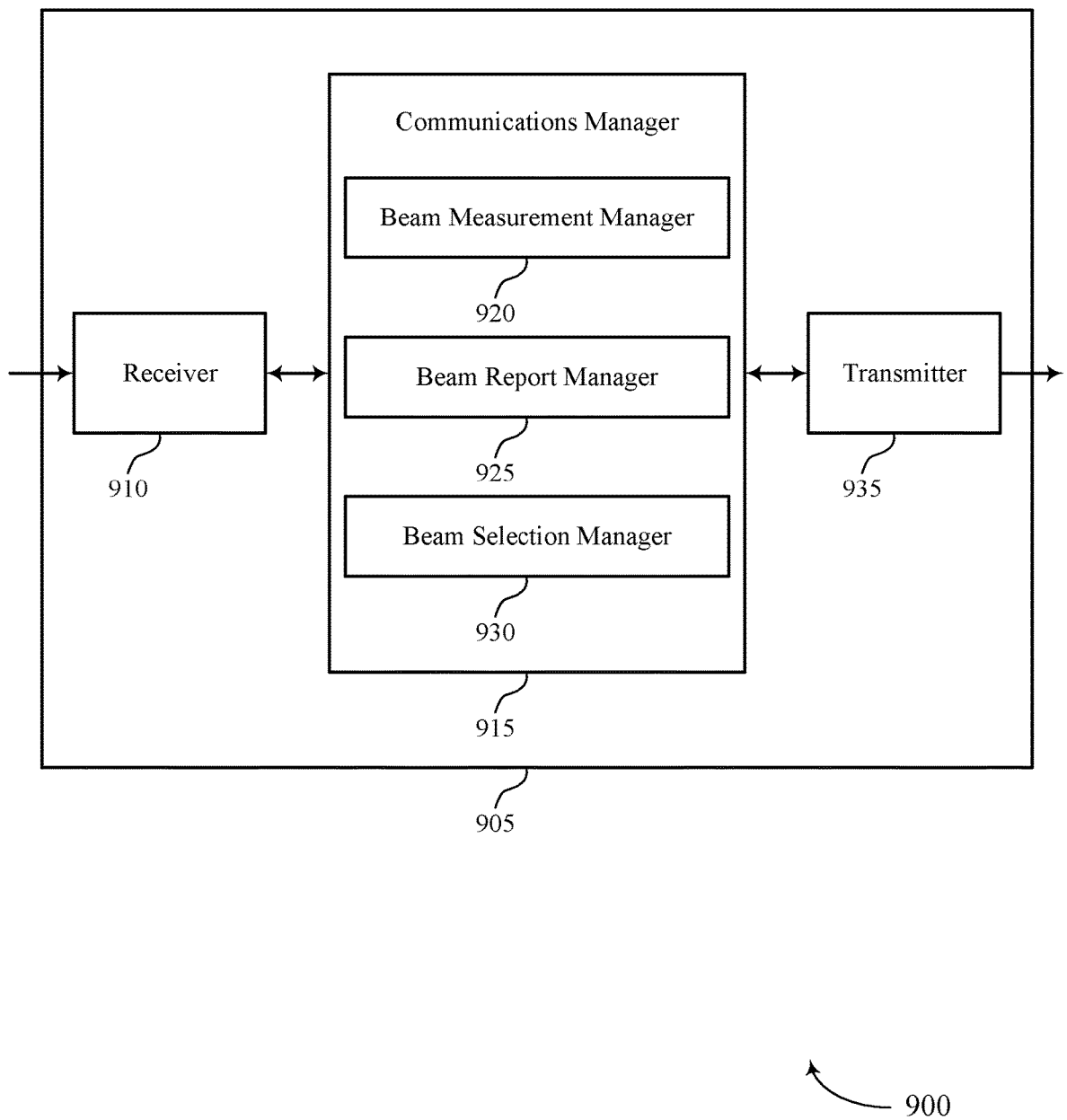

FIG. 9 shows a block diagram 900 of a device 905 that supports methods for beam refinement in a mmW channel in accordance with aspects of the present disclosure. The device 905 may be an example of aspects of a device 805, a UE 115, or a base station 105 as described herein. The device 905 may include a receiver 910, a communications manager 915, and a transmitter 935. The device 905 may also include a processor. Each of these components may be in communication with one another (e.g., via one or more buses).

Receiver 910 may receive information such as packets, user data, or control information associated with various information channels (e.g., control channels, data channels, and information related to methods for beam refinement in a mmW channel, etc.). Information may be passed on to other components of the device 905. The receiver 910 may be an example of aspects of the transceiver 1120 or 1220 as described with reference to FIGS. 11 and 12. The receiver 910 may utilize a single antenna or a set of antennas. The communications manager 915 may be an example of aspects of the communications manager 815 as described herein. The communications manager 915 may include a beam measurement manager 920, a beam report manager 925, and a beam selection manager 930. The communications manager 915 may be an example of aspects of the communications manager 1110 or 1210 as described herein.

The beam measurement manager 920 may perform a first set of beam measurements for a first set of beams over a wireless channel between the first wireless device and a second wireless device, each beam in the first set of beams having a first beam-width and perform the second set of beam measurements for the second set of beams over the wireless channel according to the indicated beam sweep order, each beam in the second set of beams having a second beam-width that is narrower than the first beam-width. The beam report manager 925 may transmit to the second wireless device a first beam measurement report for the first set of beams, the first beam measurement report indicating a beam sweep order for a second set of beam measurements for a second set of beams and transmit to the second wireless device a second beam measurement report based on the second set of beam measurements. The beam selection manager 930 may receive from the second wireless device an indication of a beam selection for transmissions from the second wireless device based on the second set of beam measurements. The beam measurement manager 920 may transmit a first set of beams over a wireless channel between the second wireless device and a first wireless device, each beam in the first set of beams having a first beam-width and transmit the second set of beams according to the indicated beam sweep order, each beam in the second set of beams having a second beam-width that is narrower than the first beam-width.

The beam report manager 925 may receive, from the first wireless device, a first beam measurement report for a first set of beams, the first beam measurement report indicating a beam sweep order for a second set of beam measurements for a second set of beams and receive a second beam measurement report from the first wireless device based on the second set of beams. The beam selection manager 930 may transmit to the first wireless device an indication of a beam selected for transmissions from the second wireless device based on the second beam measurement report. Transmitter 935 may transmit signals generated by other components of the device 905. In some examples, the transmitter 935 may be collocated with a receiver 910 in a transceiver module. For example, the transmitter 935 may be an example of aspects of the transceiver 1120 or 1220 as described with reference to FIGS. 11 and 12. The transmitter 935 may utilize a single antenna or a set of antennas.

Figure 10:
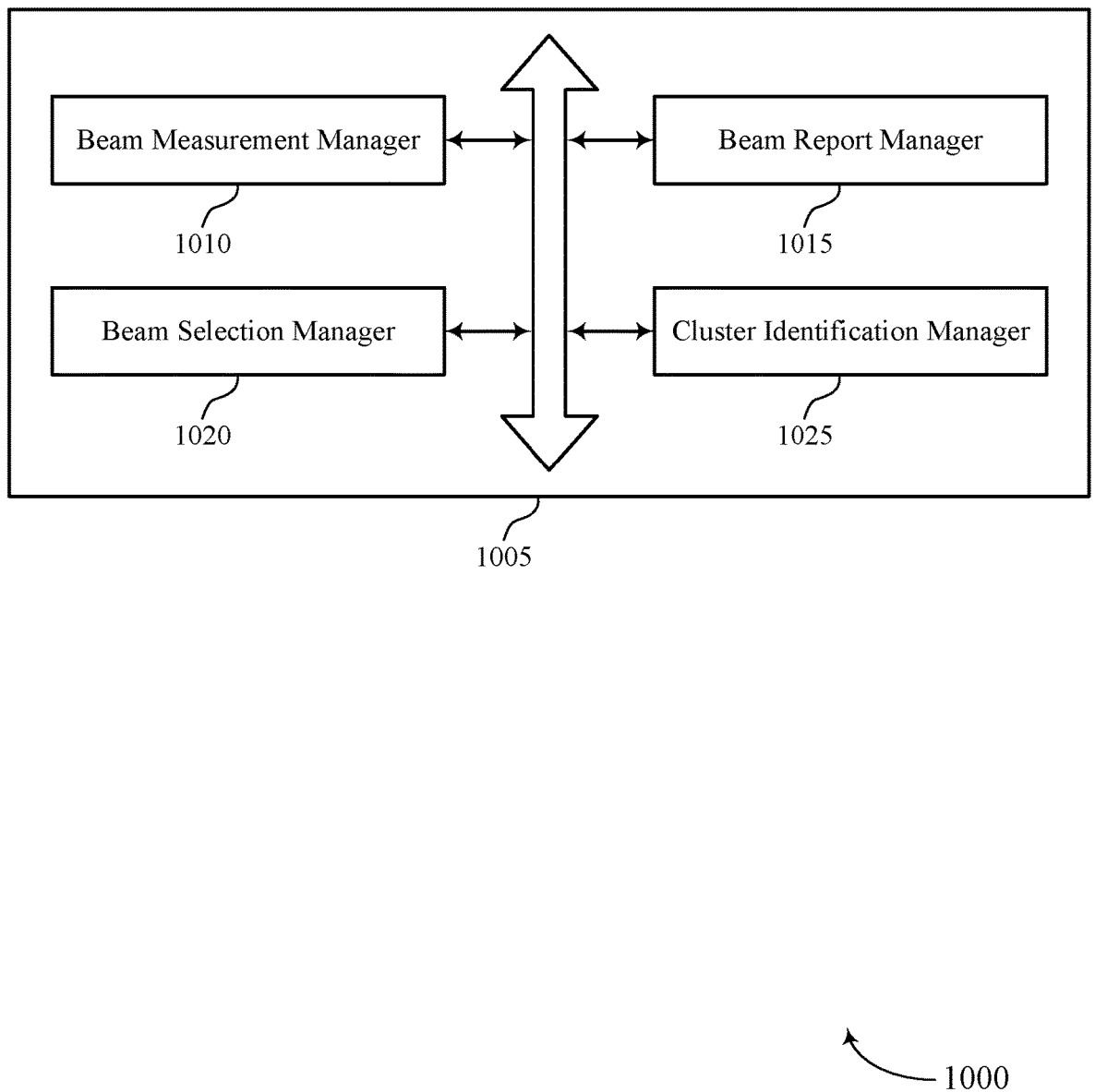
FIG. 10 shows a block diagram of a communications manager that supports methods for beam refinement in a mmW channel in accordance with aspects of the present disclosure.

FIG. 10 shows a block diagram 1000 of a communications manager 1005 that supports methods for beam refinement in a mmW channel in accordance with aspects of the present disclosure. The communications manager 1005 may be an example of aspects of a communications manager 815, a communications manager 915, or a communications manager 1110 described herein. The communications manager 1005 may include a beam measurement manager 1010, a beam report manager 1015, a beam selection manager 1020, and a cluster identification manager 1025. Each of these modules may communicate, directly or indirectly, with one another (e.g., via one or more buses).

The beam measurement manager 1010 may perform a first set of beam measurements for a first set of beams over a wireless channel between the first wireless device and a second wireless device, each beam in the first set of beams having a first beam-width. In some examples, the beam measurement manager 1010 may perform the second set of beam measurements for the second set of beams over the wireless channel according to the indicated beam sweep order, each beam in the second set of beams having a second beam-width that is narrower than the first beam-width.

In some examples, the beam measurement manager 1010 may transmit a first set of beams over a wireless channel between the second wireless device and a first wireless device, each beam in the first set of beams having a first beam-width. In some examples, the beam measurement manager 1010 may transmit the second set of beams according to the indicated beam sweep order, each beam in the second set of beams having a second beam-width that is narrower than the first beam-width. The beam report manager 1015 may transmit to the second wireless device a first beam measurement report for the first set of beams, the first beam measurement report indicating a beam sweep order for a second set of beam measurements for a second set of beams. In some examples, the beam report manager 1015 may transmit to the second wireless device a second beam measurement report based on the second set of beam measurements. In some examples, the beam report manager 1015 may receive, from the first wireless device, a first beam measurement report for a first set of beams, the first beam measurement report indicating a beam sweep order for a second set of beam measurements for a second set of beams.

In some examples, the beam report manager 1015 may receive a second beam measurement report from the first wireless device based on the second set of beams. In some cases, a sequential beam sweep order or a non-sequential beam sweep order for the second set of beams. The beam selection manager 1020 may receive from the second wireless device an indication of a beam selection for transmissions from the second wireless device based on the second set of beam measurements. In some examples, the beam selection manager 1020 may transmit to the first wireless device an indication of a beam selected for transmissions from the second wireless device based on the second beam measurement report.

The cluster identification manager 1025 may identify, based on the first set beam measurements, one or more clusters associated with one or more of the beams of the first set of beams. In some examples, the cluster identification manager 1025 may transmit an indication of the identified one or more clusters associated with the one or more of the beams from the first set of beams to the second wireless device. In some examples, the cluster identification manager 1025 may perform a time domain correlation of a delay spread for each beam from the first set of beams. In some examples, the cluster identification manager 1025 may assign a unique receive beam weighting factor to each of two or more receive radio frequency chains of the first wireless device. In some examples, the cluster identification manager 1025 may identify, based on reception with the unique receive beam weighting factor, a received signal strength for each receive radio frequency chain of the two or more receive radio frequency chains. In some examples, the cluster identification manager 1025 may select the beam sweep order based on the one or more clusters associated with the wireless channel.

In some examples, identifying multiple clusters associated with a first P1 beam pair of the first set of beams and a second P1 beam pair of the first set of beams, where the beam sweep order for the second set of beam measurements includes a first P2 beam sweep of the first P1 beam pair to obtain a first P2 beam pair, followed by a first P3 beam sweep of the first P2 beam pair to obtain a first P3 beam pair, followed by a second P2 beam sweep of the second P1 beam pair to obtain a second P2 beam pair, followed by a second P3 beam sweep of the second P2 beam pair to obtain a second P3 beam pair. In some examples, identifying a single cluster associated with a first P1 beam pair of the first set of beams and a second P1 beam pair of the first set of beams, where the beam sweep order for the second set of beam measurements includes a first P2 beam sweep of the first P1 beam pair to obtain a first P2 beam pair, followed by a second P2 beam sweep of the second P1 beam pair to obtain a second P2 beam pair, followed by a first P3 beam sweep of the first P2 beam pair to obtain a first P3 beam pair, followed by a second P3 beam sweep of the second P2 beam pair to obtain a second P3 beam pair.

Figure 11:
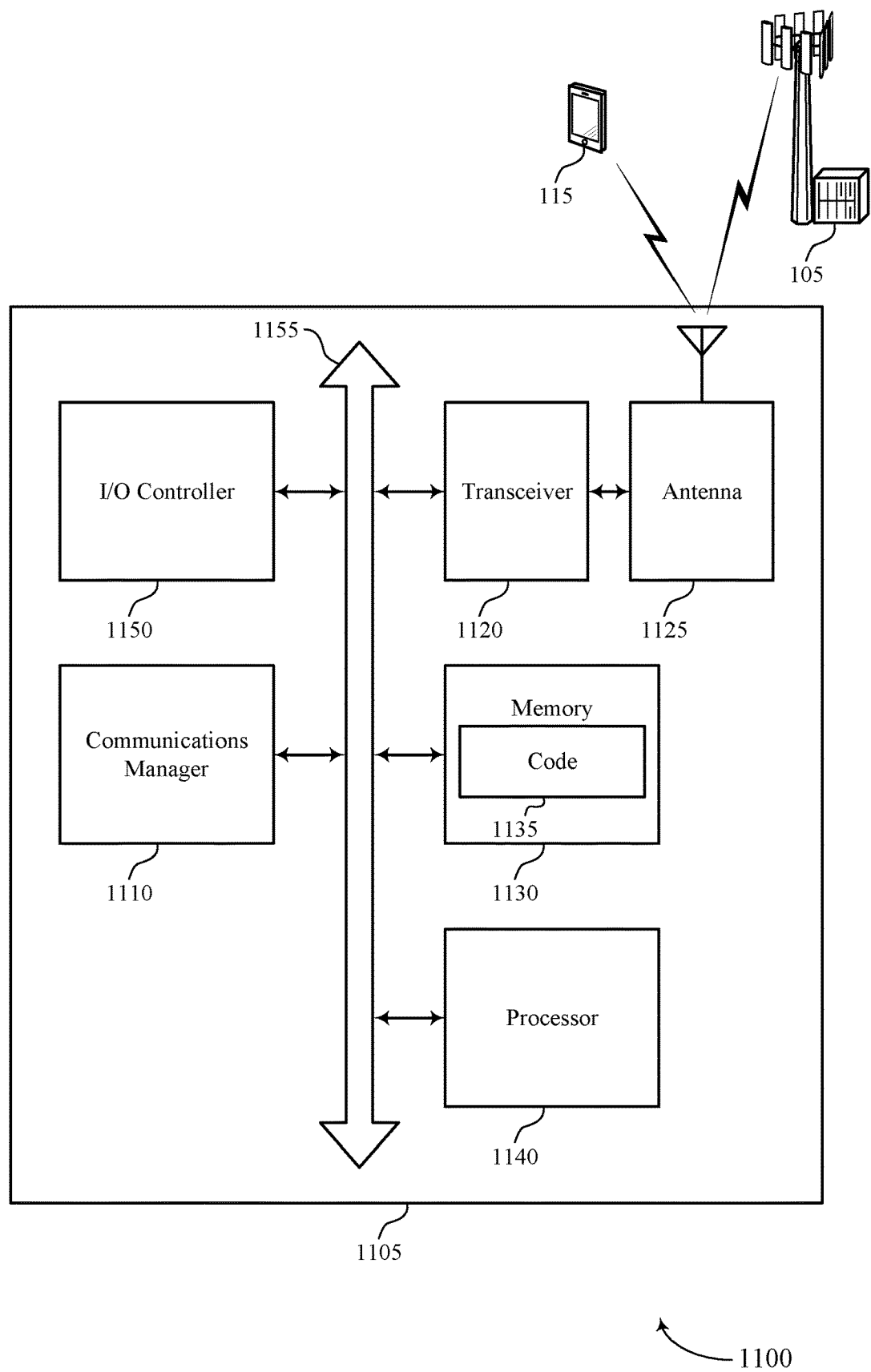
FIG. 11 shows a diagram of a system including a user equipment (UE) that supports methods for beam refinement in a mmW channel in accordance with aspects of the present disclosure.

FIG. 11 shows a diagram of a system 1100 including a device 1105 that supports methods for beam refinement in a mmW channel in accordance with aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, a transceiver 1120, an antenna 1125, memory 1130, a processor 1140, and an I/O controller 1150. These components may be in electronic communication via one or more buses (e.g., bus 1155).

The communications manager 1110 may perform a first set of beam measurements for a first set of beams over a wireless channel between the first wireless device and a second wireless device, each beam in the first set of beams having a first beam-width, perform the second set of beam measurements for the second set of beams over the wireless channel according to the indicated beam sweep order, each beam in the second set of beams having a second beam-width that is narrower than the first beam-width, transmit to the second wireless device a first beam measurement report for the first set of beams, the first beam measurement report indicating a beam sweep order for a second set of beam measurements for a second set of beams, transmit to the second wireless device a second beam measurement report based on the second set of beam measurements, and receive from the second wireless device an indication of a beam selection for transmissions from the second wireless device based on the second set of beam measurements. The communications manager 1110 may also transmit a first set of beams over a wireless channel between the second wireless device and a first wireless device, each beam in the first set of beams having a first beam-width, transmit the second set of beams according to the indicated beam sweep order, each beam in the second set of beams having a second beam-width that is narrower than the first beam-width, receive, from the first wireless device, a first beam measurement report for a first set of beams, the first beam measurement report indicating a beam sweep order for a second set of beam measurements for a second set of beams, receive a second beam measurement report from the first wireless device based on the second set of beams, and transmit to the first wireless device an indication of a beam selected for transmissions from the second wireless device based on the second beam measurement report.

Transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas. In some cases, the wireless device may include a single antenna 1125. However, in some cases the device may have more than one antenna 1125, which may be capable of concurrently transmitting or receiving multiple wireless transmissions.

The memory 1130 may include random-access memory (RAM), read-only memory (ROM), or a combination thereof. The memory 1130 may store computer-readable code 1135 including instructions that, when executed by a processor (e.g., the processor 1140) cause the device to perform various functions described herein. In some cases, the memory 1130 may contain, among other things, a basic input/output system (BIOS) which may control basic hardware or software operation such as the interaction with peripheral components or devices. The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting methods for beam refinement in a mmW channel).

The I/O controller 1150 may manage input and output signals for the device 1105. The I/O controller 1150 may also manage peripherals not integrated into the device 1105. In some cases, the I/O controller 1150 may represent a physical connection or port to an external peripheral. In some cases, the I/O controller 1150 may utilize an operating system such as iOS®, ANDROID®, MS-DOS®, MS-WINDOWS®, OS/2®, UNIX®, LINUX®, or another known operating system. In other cases, the I/O controller 1150 may represent or interact with a modem, a keyboard, a mouse, a touchscreen, or a similar device. In some cases, the I/O controller 1150 may be implemented as part of a processor. In some cases, a user may interact with the device 1105 via the I/O controller 1150 or via hardware components controlled by the I/O controller 1150. The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
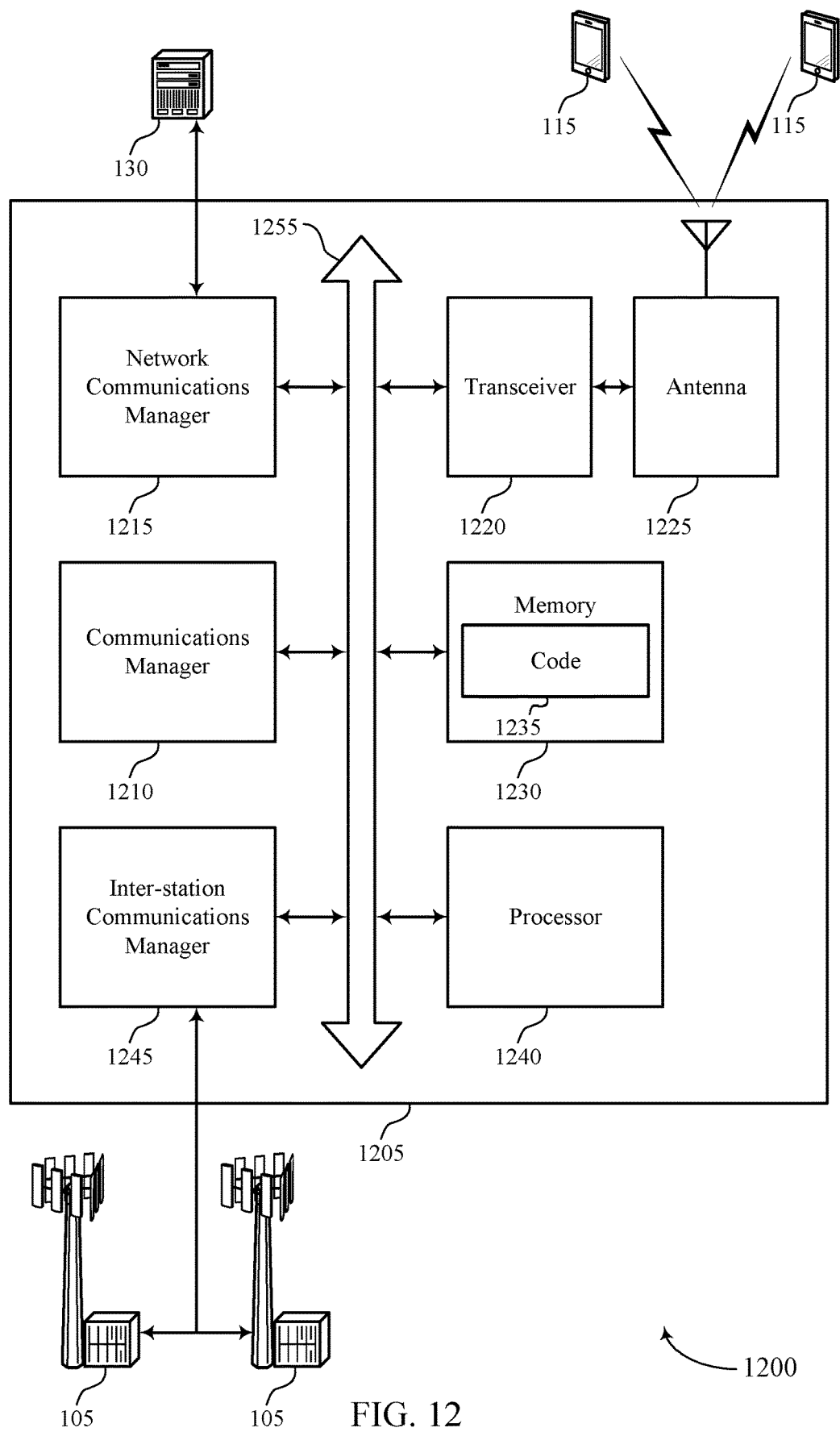
FIG. 12 shows a diagram of a system including a base station that supports methods for beam refinement in a mmW channel in accordance with aspects of the present disclosure.

FIG. 12 shows a diagram of a system 1200 including a device 1205 that supports methods for beam refinement in a mmW channel in accordance with aspects of the present disclosure. The device 1205 may be an example of or include the components of device 805, device 905, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1255).

The communications manager 1210 may perform a first set of beam measurements for a first set of beams over a wireless channel between the first wireless device and a second wireless device, each beam in the first set of beams having a first beam-width, perform the second set of beam measurements for the second set of beams over the wireless channel according to the indicated beam sweep order, each beam in the second set of beams having a second beam-width that is narrower than the first beam-width, transmit to the second wireless device a first beam measurement report for the first set of beams, the first beam measurement report indicating a beam sweep order for a second set of beam measurements for a second set of beams, transmit to the second wireless device a second beam measurement report based on the second set of beam measurements, and receive from the second wireless device an indication of a beam selection for transmissions from the second wireless device based on the first and second set of beam measurements. The communications manager 1210 may also transmit a first set of beams over a wireless channel between the second wireless device and a first wireless device, each beam in the first set of beams having a first beam-width, transmit the second set of beams according to the indicated beam sweep order, each beam in the second set of beams having a second beam-width that is narrower than the first beam-width, receive, from the first wireless device, a first beam measurement report for a first set of beams, the first beam measurement report indicating a beam sweep order for a second set of beam measurements for a second set of beams, receive a second beam measurement report from the first wireless device based on the second set of beams, and transmit to the first wireless device an indication of a beam selected for transmissions from the second wireless device based on the first and second beam measurement reports.

Network communications manager 1215 may manage communications with the core network (e.g., via one or more wired backhaul links). For example, the network communications manager 1215 may manage the transfer of data communications for client devices, such as one or more UEs 115. Transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting methods for beam refinement in a mmW channel).

Inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, inter-station communications manager 1245 may provide an X2 interface within an LTE/LTE-A wireless communication network technology to provide communication between base stations 105. The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
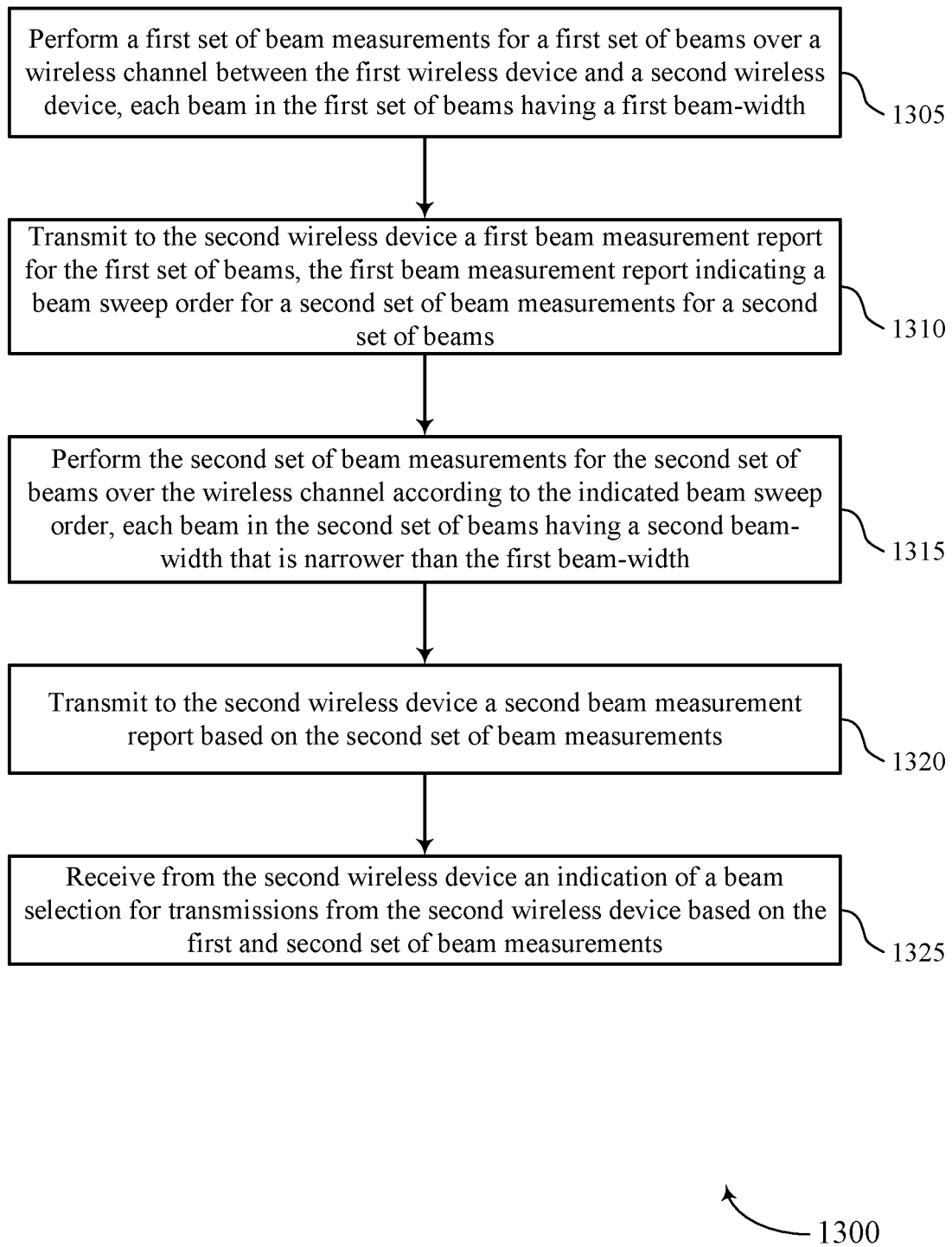
FIGS. 13 through 15 show flowcharts illustrating methods that support methods for beam refinement in a mmW channel in accordance with aspects of the present disclosure.

FIG. 13 shows a flowchart illustrating a method 1300 that supports methods for beam refinement in a mmW channel in accordance with aspects of the present disclosure. The operations of method 1300 may be implemented by a UE 115 or base station 105 or its components as described herein. For example, the operations of method 1300 may be performed by a communications manager as described with reference to FIGS. 8 through 12. In some examples, a UE or base station may execute a set of instructions to control the functional elements of the UE or base station to perform the functions described herein. Additionally or alternatively, a UE or base station may perform aspects of the functions described herein using special-purpose hardware.

At 1305, the UE or base station may perform a first set of beam measurements for a first set of beams over a wireless channel between the first wireless device and a second wireless device, each beam in the first set of beams having a first beam-width. The operations of 1305 may be performed according to the methods described herein. In some examples, aspects of the operations of 1305 may be performed by a beam measurement manager as described with reference to FIGS. 8 through 12.

At 1310, the UE or base station may transmit to the second wireless device a first beam measurement report for the first set of beams, the first beam measurement report indicating a beam sweep order for a second set of beam measurements for a second set of beams. The operations of 1310 may be performed according to the methods described herein. In some examples, aspects of the operations of 1310 may be performed by a beam report manager as described with reference to FIGS. 8 through 12. At 1315, the UE or base station may perform the second set of beam measurements for the second set of beams over the wireless channel according to the indicated beam sweep order, each beam in the second set of beams having a second beam-width that is narrower than the first beam-width. The operations of 1315 may be performed according to the methods described herein. In some examples, aspects of the operations of 1315 may be performed by a beam measurement manager as described with reference to FIGS. 8 through 12.

At 1320, the UE or base station may transmit to the second wireless device a second beam measurement report based on the second set of beam measurements. The operations of 1320 may be performed according to the methods described herein. In some examples, aspects of the operations of 1320 may be performed by a beam report manager as described with reference to FIGS. 8 through 12. At 1325, the UE or base station may receive from the second wireless device an indication of a beam selection for transmissions from the second wireless device based on the second set of beam measurements. The operations of 1325 may be performed according to the methods described herein. In some examples, aspects of the operations of 1325 may be performed by a beam selection manager as described with reference to FIGS. 8 through 12.

Figure 14:
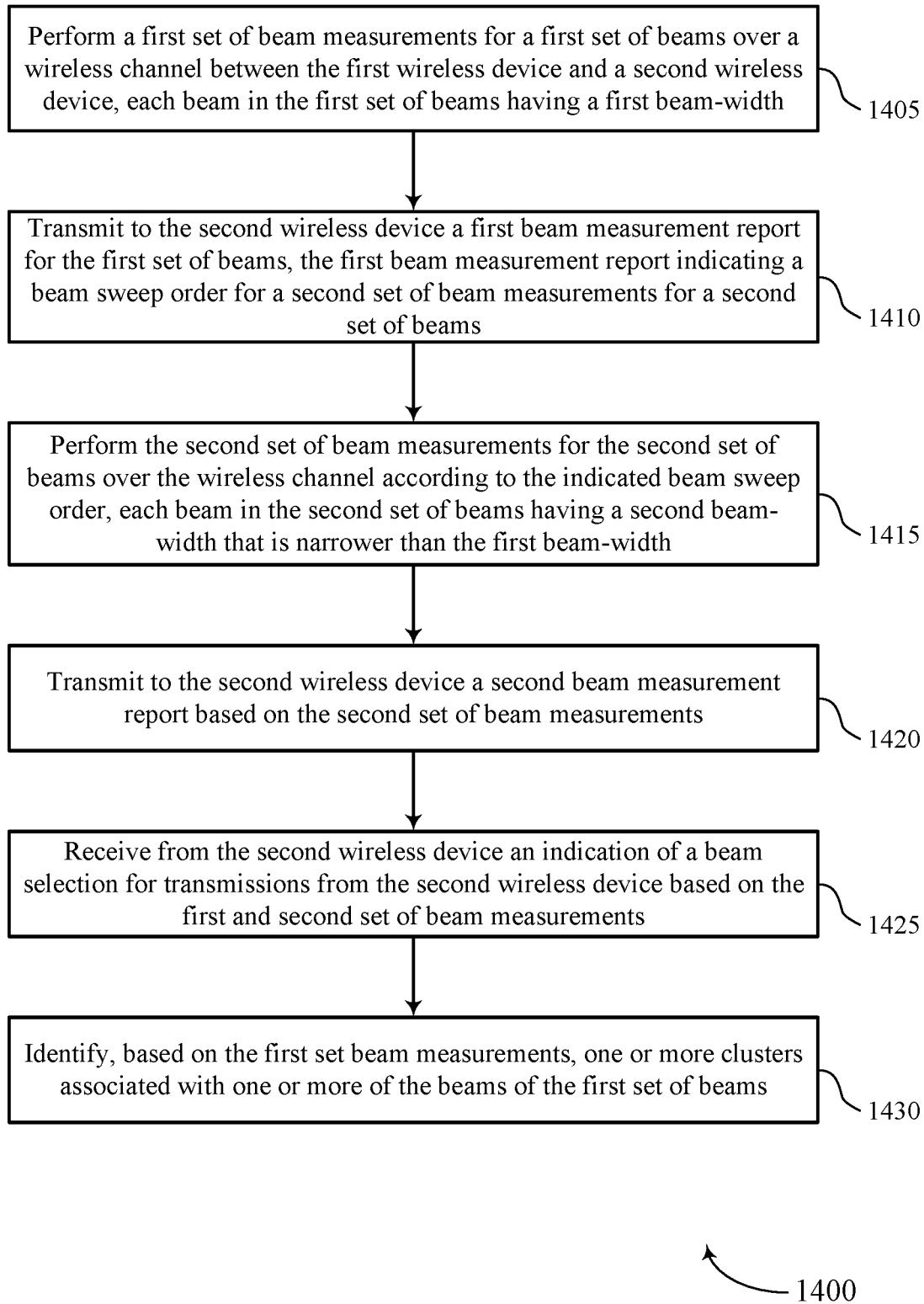

FIG. 14 shows a flowchart illustrating a method 1400 that supports methods for beam refinement in a mmW channel in accordance with aspects of the present disclosure. The operations of method 1400 may be implemented by a UE 115 or base station 105 or its components as described herein. For example, the operations of method 1400 may be performed by a communications manager as described with reference to FIGS. 8 through 12. In some examples, a UE or base station may execute a set of instructions to control the functional elements of the UE or base station to perform the functions described herein. Additionally or alternatively, a UE or base station may perform aspects of the functions described herein using special-purpose hardware.

At 1405, the UE or base station may perform a first set of beam measurements for a first set of beams over a wireless channel between the first wireless device and a second wireless device, each beam in the first set of beams having a first beam-width. The operations of 1405 may be performed according to the methods described herein. In some examples, aspects of the operations of 1405 may be performed by a beam measurement manager as described with reference to FIGS. 8 through 12. At 1410, the UE or base station may transmit to the second wireless device a first beam measurement report for the first set of beams, the first beam measurement report indicating a beam sweep order for a second set of beam measurements for a second set of beams. The operations of 1410 may be performed according to the methods described herein. In some examples, aspects of the operations of 1410 may be performed by a beam report manager as described with reference to FIGS. 8 through 12.

At 1415, the UE or base station may perform the second set of beam measurements for the second set of beams over the wireless channel according to the indicated beam sweep order, each beam in the second set of beams having a second beam-width that is narrower than the first beam-width. The operations of 1415 may be performed according to the methods described herein. In some examples, aspects of the operations of 1415 may be performed by a beam measurement manager as described with reference to FIGS. 8 through 12. At 1420, the UE or base station may transmit to the second wireless device a second beam measurement report based on the second set of beam measurements. The operations of 1420 may be performed according to the methods described herein. In some examples, aspects of the operations of 1420 may be performed by a beam report manager as described with reference to FIGS. 8 through 12.

At 1425, the UE or base station may receive from the second wireless device an indication of a beam selection for transmissions from the second wireless device based on the second set of beam measurements. The operations of 1425 may be performed according to the methods described herein. In some examples, aspects of the operations of 1425 may be performed by a beam selection manager as described with reference to FIGS. 8 through 12. At 1430, the UE or base station may identify, based on the first set beam measurements, one or more clusters associated with one or more of the beams of the first set of beams. The operations of 1430 may be performed according to the methods described herein. In some examples, aspects of the operations of 1430 may be performed by a cluster identification manager as described with reference to FIGS. 8 through 12.

Figure 15:
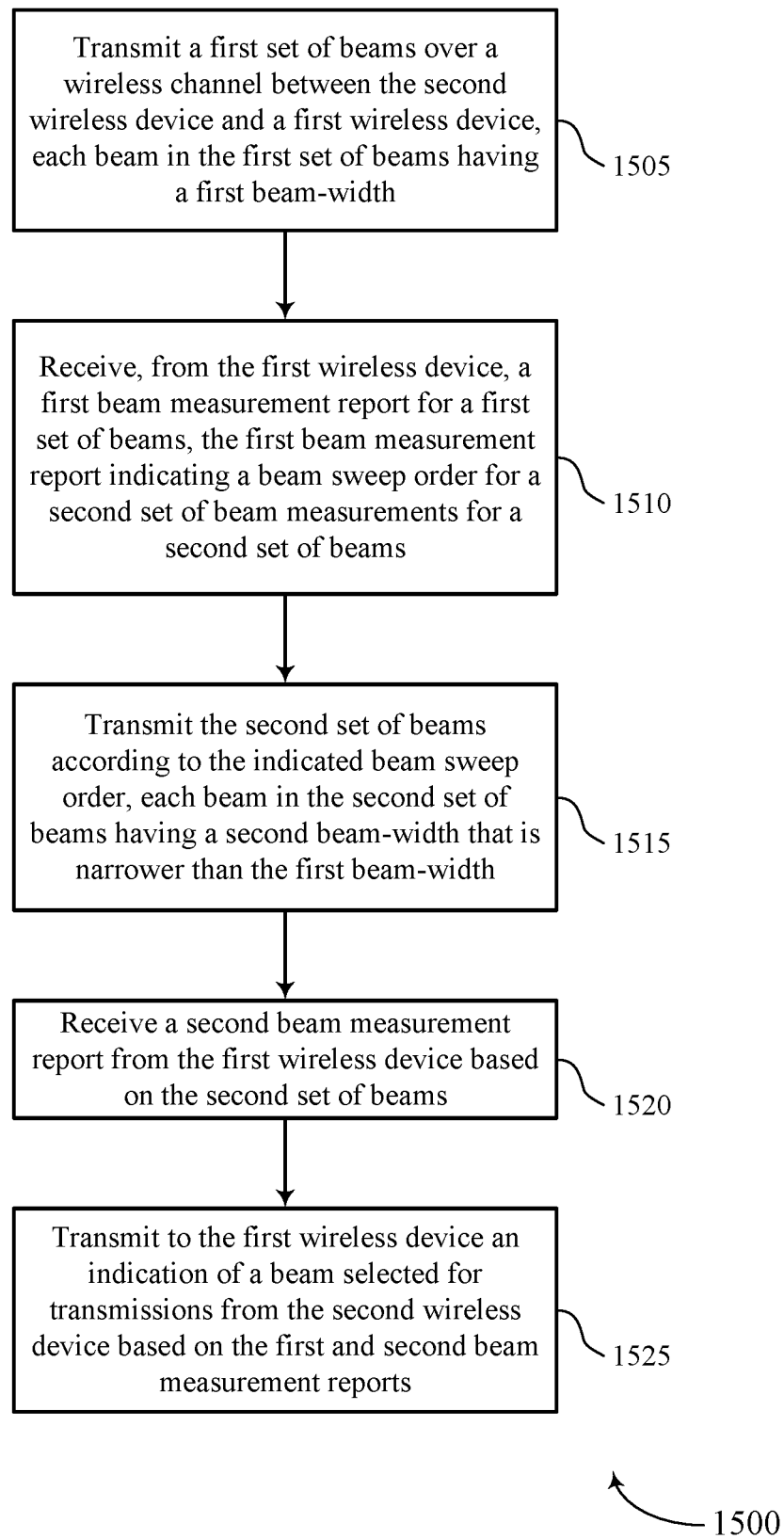

FIG. 15 shows a flowchart illustrating a method 1500 that supports methods for beam refinement in a mmW channel in accordance with aspects of the present disclosure. The operations of method 1500 may be implemented by a UE 115 or base station 105 or its components as described herein. For example, the operations of method 1500 may be performed by a communications manager as described with reference to FIGS. 8 through 12. In some examples, a UE or base station may execute a set of instructions to control the functional elements of the UE or base station to perform the functions described herein. Additionally or alternatively, a UE or base station may perform aspects of the functions described herein using special-purpose hardware.

At 1505, the UE or base station may transmit a first set of beams over a wireless channel between the second wireless device and a first wireless device, each beam in the first set of beams having a first beam-width. The operations of 1505 may be performed according to the methods described herein. In some examples, aspects of the operations of 1505 may be performed by a beam measurement manager as described with reference to FIGS. 8 through 12. At 1510, the UE or base station may receive, from the first wireless device, a first beam measurement report for a first set of beams, the first beam measurement report indicating a beam sweep order for a second set of beam measurements for a second set of beams. The operations of 1510 may be performed according to the methods described herein. In some examples, aspects of the operations of 1510 may be performed by a beam report manager as described with reference to FIGS. 8 through 12.

At 1515, the UE or base station may transmit the second set of beams according to the indicated beam sweep order, each beam in the second set of beams having a second beam-width that is narrower than the first beam-width. The operations of 1515 may be performed according to the methods described herein. In some examples, aspects of the operations of 1515 may be performed by a beam measurement manager as described with reference to FIGS. 8 through 12. At 1520, the UE or base station may receive a second beam measurement report from the first wireless device based on the second set of beams. The operations of 1520 may be performed according to the methods described herein. In some examples, aspects of the operations of 1520 may be performed by a beam report manager as described with reference to FIGS. 8 through 12.

At 1525, the UE or base station may transmit to the first wireless device an indication of a beam selected for transmissions from the second wireless device based on the second beam measurement report. The operations of 1525 may be performed according to the methods described herein. In some examples, aspects of the operations of 1525 may be performed by a beam selection manager as described with reference to FIGS. 8 through 12. It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein. Thus, example 1 is a method for wireless communication at a first wireless device that includes: performing a first set of beam measurements for a first plurality of beams over a wireless channel between the first wireless device and a second wireless device, each beam in the first plurality of beams having a first beam-width, transmitting to the second wireless device a first beam measurement report for the first plurality of beams, the first beam measurement report indicating a beam sweep order for a second set of beam measurements for a second plurality of beams, performing the second set of beam measurements for the second plurality of beams over the wireless channel according to the indicated beam sweep order, each beam in the second plurality of beams having a second beam-width that is narrower than the first beam-width, transmitting to the second wireless device a second beam measurement report based at least in part on the second set of beam measurements, and receiving from the second wireless device an indication of a beam selection for transmissions from the second wireless device based at least in part on the first and second set of beam measurements.

In example 2, the method of example 1 may include identifying, based at least in part on the first set beam measurements, one or more clusters associated with one or more of the beams of the first plurality of beams. In example 3, the method of examples 1 and 2 may include transmitting an indication of the identified one or more clusters associated with the one or more of the beams from the first plurality of beams to the second wireless device. In example 4, the method of examples 1-3 may include where identifying the one or more clusters comprises: performing a time domain correlation of a delay spread for each beam from the first plurality of beams. In example 5, the method of examples 1-4 may include where identifying the one or more clusters comprises: assigning a unique receive beam weighting factor to each of two or more receive radio frequency chains of the first wireless device; and identifying, based at least in part on reception with the unique receive beam weighting factor, a received signal strength for each receive radio frequency chain of the two or more receive radio frequency chains. In example 6, the method of examples 1-5 may include selecting the beam sweep order based at least in part on the one or more clusters associated with the wireless channel.

In example 7, the method of examples 1-6 may include identifying multiple clusters associated with a first P1 beam pair of the first plurality of beams and a second P1 beam pair of the first plurality of beams, where the beam sweep order for the second set of beam measurements comprises a first P2 beam sweep of the first P1 beam pair to obtain a first P2 beam pair, followed by a first P3 beam sweep of the first P2 beam pair to obtain a first P3 beam pair, followed by a second P2 beam sweep of the second P1 beam pair to obtain a second P2 beam pair, followed by a second P3 beam sweep of the second P2 beam pair to obtain a second P3 beam pair. In example 8, the method of examples 1-7 may include identifying a single cluster associated with a first P1 beam pair of the first plurality of beams and a second P1 beam pair of the first plurality of beams, where the beam sweep order for the second set of beam measurements comprises a first P2 beam sweep of the first P1 beam pair to obtain a first P2 beam pair, followed by a second P2 beam sweep of the second P1 beam pair to obtain a second P2 beam pair, followed by a first P3 beam sweep of the first P2 beam pair to obtain a first P3 beam pair, followed by a second P3 beam sweep of the second P2 beam pair to obtain a second P3 beam pair. In example 9, the method of examples 1-8 the beam sweep order comprises at least one of: a sequential beam sweep order or a non-sequential beam sweep order for the second plurality of beams.

Example 10 is a method for wireless communications at a second wireless device that includes: transmitting a first plurality of beams over a wireless channel between the second wireless device and a first wireless device, each beam in the first plurality of beams having a first beam-width, receiving, from the first wireless device, a first beam measurement report for a first plurality of beams, the first beam measurement report indicating a beam sweep order for a second set of beam measurements for a second plurality of beams, transmitting the second plurality of beams according to the indicated beam sweep order, each beam in the second plurality of beams having a second beam-width that is narrower than the first beam-width, receiving a second beam measurement report from the first wireless device based at least in part on the second plurality of beams, and transmitting to the first wireless device an indication of a beam selected for transmissions from the second wireless device based at least in part on the first and second beam measurement reports.

In example 11, the method of example 10 may include receiving, from the first wireless device, an indication related to one or more clusters associated with the one or more of the beams of the second plurality of beams. In example 12, the method of examples 10 and 11 may include performing a time domain correlation of a delay spread for each beam from the first plurality of beams. In example 13, the method of examples 10-12 may include assigning a unique receive beam weighting factor to each of two or more receive radio frequency chains of the second wireless device, and identifying, based at least in part on reception with the unique receive beam weighting factor, a received signal strength for each receive radio frequency chain of the two or more receive radio frequency chains. In example 14, the method of examples 10-13 may include selecting the beam sweep order based at least in part on the one or more clusters associated with the wireless channel. In example 15, the method of examples 10-14, the beam sweep order may include operations, features, means, or instructions for a sequential beam sweep order or a non-sequential beam sweep order for the second set of beams. In example 16, the method of examples 10-15 one or more of the first plurality of beams or the second plurality of beams relate to backhaul traffic. In example 17, the method of examples 10-16 one or more of the first plurality of beams or the second plurality of beams relate to access traffic.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a first wireless device, comprising:
    performing a first set of beam measurements for a first plurality of beams over a wireless channel between the first wireless device and a second wireless device, each beam in the first plurality of beams having a first beam-width;
    identifying, based at least in part on the first set of beam measurements, one or more clusters associated with one or more of the beams of the first plurality of beams;
    transmitting to the second wireless device a first beam measurement report for the first plurality of beams, the first beam measurement report indicating a beam sweep order for a second set of beam measurements for a second plurality of beams, wherein the beam sweep order is selected based at least in part on the one or more clusters;
    performing the second set of beam measurements for the second plurality of beams over the wireless channel according to the indicated beam sweep order, each beam in the second plurality of beams having a second beam-width that is narrower than the first beam-width;
    transmitting to the second wireless device a second beam measurement report based at least in part on the second set of beam measurements; and
    receiving from the second wireless device an indication of a beam selection for transmissions from the second wireless device based at least in part on the first and second set of beam measurements.

2. The method of claim 1, further comprising:
    transmitting an indication of the identified one or more clusters associated with the one or more of the beams from the first plurality of beams to the second wireless device.

3. The method of claim 1, wherein identifying the one or more clusters comprises:
    performing a time domain correlation of a delay spread for each beam from the first plurality of beams.

4. The method of claim 1, wherein identifying the one or more clusters comprises:
assigning a unique receive beam weighting factor to each of two or more receive radio frequency chains of the first wireless device; and
identifying, based at least in part on reception with the unique receive beam weighting factor, a received signal strength for each receive radio frequency chain of the two or more receive radio frequency chains.

5. The method of claim 1, further comprising:
identifying multiple clusters associated with a first P1 beam pair of the first plurality of beams and a second P1 beam pair of the first plurality of beams, wherein the beam sweep order for the second set of beam measurements comprises a first P2 beam sweep of the first P1 beam pair to obtain a first P2 beam pair, followed by a first P3 beam sweep of the first P2 beam pair to obtain a first P3 beam pair, followed by a second P2 beam sweep of the second P1 beam pair to obtain a second P2 beam pair, followed by a second P3 beam sweep of the second P2 beam pair to obtain a second P3 beam pair.

6. The method of claim 1, further comprising:
identifying a single cluster associated with a first P1 beam pair of the first plurality of beams and a second P1 beam pair of the first plurality of beams, wherein the beam sweep order for the second set of beam measurements comprises a first P2 beam sweep of the first P1 beam pair to obtain a first P2 beam pair, followed by a second P2 beam sweep of the second P1 beam pair to obtain a second P2 beam pair, followed by a first P3 beam sweep of the first P2 beam pair to obtain a first P3 beam pair, followed by a second P3 beam sweep of the second P2 beam pair to obtain a second P3 beam pair.

7. The method of claim 1, wherein the beam sweep order comprises
a sequential beam sweep order for the second plurality of beams.

8. A method for wireless communication by a second wireless device, comprising:
transmitting a first plurality of beams over a wireless channel between the second wireless device and a first wireless device, each beam in the first plurality of beams having a first beam-width;
receiving, from the first wireless device, an indication related to one or more clusters associated with the one or more of the beams of the second plurality of beams;
receiving, from the first wireless device, a first beam measurement report for the first plurality of beams, the first beam measurement report indicating a beam sweep order for a second set of beam measurements for a second plurality of beams, wherein the beam sweep order is selected based at least in part on the one or more clusters;
transmitting the second plurality of beams according to the indicated beam sweep order, each beam in the second plurality of beams having a second beam-width that is narrower than the first beam-width;
receiving a second beam measurement report from the first wireless device based at least in part on the second plurality of beams; and
transmitting to the first wireless device an indication of a beam selected for transmissions from the second wireless device based at least in part on the first and second beam measurement reports.

9. The method of claim 8, further comprising:
performing a time domain correlation of a delay spread for each beam from the first plurality of beams.

10. The method of claim 8, further comprising:
assigning a unique receive beam weighting factor to each of two or more receive radio frequency chains of the second wireless device; and
identifying, based at least in part on reception with the unique receive beam weighting factor, a received signal strength for each receive radio frequency chain of the two or more receive radio frequency chains.

11. The method of claim 8, wherein the beam sweep order comprises
a non-sequential beam sweep order for the second plurality of beams.

12. The method of claim 8, wherein one or more of the first plurality of beams or the second plurality of beams relate to backhaul traffic.

13. The method of claim 8, wherein one or more of the first plurality of beams or the second plurality of beams relate to access traffic.

14. A first wireless apparatus for wireless communication, comprising:
a processor,
memory in electronic communication with the processor; and
instructions stored in the memory and executable by the processor to cause the apparatus to:
perform a first set of beam measurements for a first plurality of beams over a wireless channel between the first wireless apparatus and a second wireless apparatus, each beam in the first plurality of beams having a first beam-width;
identify, based at least in part on the first set of beam measurements, one or more clusters associated with one or more of the beams of the first plurality of beams;
transmit to the second wireless apparatus a first beam measurement report for the first plurality of beams, the first beam measurement report indicating a beam sweep order for a second set of beam measurements for a second plurality of beams, wherein the beam sweep order is based at least in part on the one or more clusters;
perform the second set of beam measurements for the second plurality of beams over the wireless channel according to the indicated beam sweep order, each beam in the second plurality of beams having a second beam-width that is narrower than the first beam-width;
transmit to the second wireless apparatus a second beam measurement report based at least in part on the second set of beam measurements; and
receive from the second wireless apparatus an indication of a beam selection for transmissions from the second wireless apparatus based at least in part on the first and second set of beam measurements.

15. The first wireless apparatus of claim 14, wherein the instructions are further executable by the processor to cause the first wireless apparatus to:
transmit an indication of the identified one or more clusters associated with the one or more of the beams from the first plurality of beams to the second wireless apparatus.

16. The first wireless apparatus of claim 14, wherein the instructions to identify the one or more clusters are executable by the processor to cause the first wireless apparatus to:
perform a time domain correlation of a delay spread for each beam from the first plurality of beams.

17. The first wireless apparatus of claim 14, wherein the instructions to identify the one or more clusters are executable by the processor to cause the first wireless apparatus to:
  assign a unique receive beam weighting factor to each of two or more receive radio frequency chains of the first wireless apparatus; and
  identify, based at least in part on reception with the unique receive beam weighting factor, a received signal strength for each receive radio frequency chain of the two or more receive radio frequency chains.

18. The first wireless apparatus of claim 14, wherein the instructions are further executable by the processor to cause the first wireless apparatus to:
  identify multiple clusters associated with a first P1 beam pair of the first plurality of beams and a second P1 beam pair of the first plurality of beams, wherein the beam sweep order for the second set of beam measurements comprises a first P2 beam sweep of the first P1 beam pair to obtain a first P2 beam pair, followed by a first P3 beam sweep of the first P2 beam pair to obtain a first P3 beam pair, followed by a second P2 beam sweep of the second P1 beam pair to obtain a second P2 beam pair, followed by a second P3 beam sweep of the second P2 beam pair to obtain a second P3 beam pair.

19. The first wireless apparatus of claim 14, wherein the instructions are further executable by the processor to cause the first wireless apparatus to:
  identify a single cluster associated with a first P1 beam pair of the first plurality of beams and a second P1 beam pair of the first plurality of beams, wherein the beam sweep order for the second set of beam measurements comprises a first P2 beam sweep of the first P1 beam pair to obtain a first P2 beam pair, followed by a second P2 beam sweep of the second P1 beam pair to obtain a second P2 beam pair, followed by a first P3 beam sweep of the first P2 beam pair to obtain a first P3 beam pair, followed by a second P3 beam sweep of the second P2 beam pair to obtain a second P3 beam pair.

20. The first wireless apparatus of claim 14, wherein the beam sweep order comprises
  a non-sequential beam sweep order for the second plurality of beams.

21. A second wireless apparatus for wireless communication, comprising:
  a processor,
  memory in electronic communication with the processor; and
  instructions stored in the memory and executable by the processor to cause the apparatus to:
    transmit a first plurality of beams over a wireless channel between the second wireless apparatus and a first wireless apparatus, each beam in the first plurality of beams having a first beam-width;
    receive, from the first wireless apparatus, an indication related to one or more clusters associated with the one or more of the beams of the second plurality of beams:
    receive, from the first wireless apparatus, a first beam measurement report for a first plurality of beams, the first beam measurement report indicating a beam sweep order for a second set of beam measurements for a second plurality of beams, wherein the beam sweep order is based at least in part on the one or more clusters;
    transmit the second plurality of beams according to the indicated beam sweep order, each beam in the second plurality of beams having a second beam-width that is narrower than the first beam-width;
    receive a second beam measurement report from the first wireless apparatus based at least in part on the second plurality of beams; and
    transmit to the first wireless apparatus an indication of a beam selected for transmissions from the second wireless apparatus based at least in part on the first and second beam measurement reports.

22. The second wireless apparatus of claim 21, wherein the instructions are further executable by the processor to cause the second wireless apparatus to: select the beam sweep order based at least in part on the one or more clusters associated with the wireless channel.

23. The second wireless apparatus of claim 21, wherein the instructions are further executable by the processor to cause the second wireless apparatus to: assign a unique receive beam weighting factor to each of two or more receive radio frequency chains of the second wireless apparatus; and identify, based at least in part on reception with the unique receive beam weighting factor, a received signal strength for each receive radio frequency chain of the two or more receive radio frequency chains.

* * * * *